(12) United States Patent
Takagi et al.

(10) Patent No.: US 11,245,700 B2
(45) Date of Patent: Feb. 8, 2022

(54) INFORMATION PROCESSING APPARATUS, INFORMATION PROCESSING METHOD, AND RECORDING MEDIUM RECORDING INFORMATION PROCESSING PROGRAM

(71) Applicant: FUJITSU LIMITED, Kawasaki (JP)

(72) Inventors: Junji Takagi, Kawasaki (JP); Hidenobu Ito, Kawasaki (JP); Koichi Yasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 16/703,159

(22) Filed: Dec. 4, 2019

(65) Prior Publication Data

US 2020/0186533 A1  Jun. 11, 2020

(30) Foreign Application Priority Data

Dec. 6, 2018 (JP) .............................. JP2018-228785
Sep. 24, 2019 (JP) .............................. JP2019-172736

(51) Int. Cl.
*G06F 7/04* (2006.01)
*G06F 15/16* (2006.01)
(Continued)

(52) U.S. Cl.
CPC ........ *H04L 63/101* (2013.01); *H04L 63/0884* (2013.01); *H04L 63/126* (2013.01)

(58) Field of Classification Search
CPC . H04L 63/101; H04L 63/0884; H04L 63/126; G06F 21/629; G06F 21/44; G06F 21/34
See application file for complete search history.

(56) References Cited

U.S. PATENT DOCUMENTS

2015/0371026 A1  12/2015  Gnanasekaran
2018/0097640 A1*  4/2018  Queralt ................. G06F 21/31

FOREIGN PATENT DOCUMENTS

CN  108092776 A  5/2018
JP  2009-118110 A  5/2009

OTHER PUBLICATIONS

Sampath Srinivas; Dirk Balfanz; Eric Tiffany; Universal 2nd Factor (U2F) Overview; 2014 (Year: 2014).*

(Continued)

*Primary Examiner* — Amie C. Lin
(74) *Attorney, Agent, or Firm* — Fujitsu Patent Center

(57) ABSTRACT

An information processing apparatus includes: a memory; and a processor coupled to the memory and configured to: generate, when a browser is coupled to an authenticator, unique identification information by using information acquired from the browser; verify, by referring to a first list storing identification information of a browser permitted to be coupled, whether or not the identification information is stored in the first list, store a verification result in the memory while linking with the identification information, and transmit a verification completion notification to the browser; acquire, by receiving unique identification information generated by the authenticator using the information acquired from the browser, the verification result linked with the identification information from the memory; and transmit the acquisition result to the authenticator that controls coupling propriety with the browser.

9 Claims, 20 Drawing Sheets

(51) Int. Cl.
    *G06F 17/30*    (2006.01)
    *H04L 29/06*    (2006.01)

(56) References Cited

OTHER PUBLICATIONS

Srinivas, Sampath et al., "Universal 2nd Factor(U2F) Overview", Specification Set: fido-u2f-v1.0-rd-20140209 Review Draft, pp. 1-24, Feb. 9, 2014, Retrieved from the Internet: URL:https://fidoalliance.org/specs/fido-u2f-v1.0-rd-20140209/fido-u2f-overview-v1.0-rd-20140209.pdf, [retrieved on Mar. 6, 2020], XP055674562.
Yubico, "Breaking FIDO Are Exploits in There?", 25 pages, Jan. 1, 2016 Retrieved from the Internet: URL:https://www.blackhat.com/docs/us-16/materials/us-16-Chong-Breaking-FIDO-Are-Exploits-In-There.pdf [retrieved on Mar. 6, 2020], XP055674566.
Fido Alliance: "FIDO UAF Specification v1.1", Fido Alliance, 214 pages, Oct. 5, 2016 Retrieved from the Internet: URL:https://fidoalliance.org/specs/fido-uaf-v1.1-rd-20161005.zip [retrieved on Nov. 24, 2017], XP55428722A.
Extended European Search Report dated Mar. 17, 2020 for corresponding European Patent Application No. 19213501.0, 9 pages.
"FIDO Alliance", [Online], Searched on Nov. 22, 2018 (4 pages) https://fidoalliance.org/specifications/overview/.
"FIDO Alliance", [Online], Searched on Nov. 22, 2018 (7 pages) https://fidoalliance.org/fido2/.
EPOA—Office Action of European Patent Application No. 19313501.0 dated Dec. 7, 2021. **References cited in the EPOA were previously submitted in the IDS filed on Jun. 12, 2020.

* cited by examiner

FIG. 9A

| | |
|---|---|
| MEASUREMENT APPLICATION (Platform APPLICATION) SIDE PORT NUMBER | 14640 |
| MEASUREMENT APPLICATION (Platform APPLICATION) SIDE ADDRESS | 16777343 |

FIG. 9B

| | |
|---|---|
| AUTHENTICATION LIBRARY (Polyfill) SIDE PORT NUMBER | 35292 |
| AUTHENTICATION LIBRARY (Polyfill) SIDE ADDRESS | 16777343 |

FIG. 9C

| | |
|---|---|
| THE NUMBER OF TCP COUPLINGS | 69 |
| SERVER PORT NUMBER OF INTER-PROCESS COMMUNICATION | 14640 |
| SERVER ADDRESS OF INTER-PROCESS COMMUNICATION | 16777343 |
| CLIENT PORT NUMBER OF INTER-PROCESS COMMUNICATION | 35292 |
| CLIENT ADDRESS OF INTER-PROCESS COMMUNICATION | 16777343 |
| PROCESS ID OF COUPLING SOURCE APPLICATION | 13332 |
| ... | ... |
| ... | ... |

FIG. 20

| TIME STAMP | CALLER APPLICATION VERIFICATION RESULT | PROCESS NAME AND FRONT DISPLAY APPLICATION INFORMATION MATCHING VERIFICATION RESULT | PROVIDING SERVER VERIFICATION RESULT | SIGNATURE PROCESSING |
|---|---|---|---|---|
| 2019/4/26 13:55:10 | OK | OK | OK | PERMISSION |
| 2019/4/26 13:55:20 | NG | NG | NG | NON-PERMISSION |
| ... | ... | ... | ... | ... |

INFORMATION PROCESSING APPARATUS, INFORMATION PROCESSING METHOD, AND RECORDING MEDIUM RECORDING INFORMATION PROCESSING PROGRAM

CROSS-REFERENCE TO RELATED APPLICATION

This application is based upon and claims the benefit of priority of the prior Japanese Patent Application No. 2019-172736, filed on Sep. 24, 2019, and the Japanese Patent Application No. 2018-228785, filed on Dec. 6, 2018, the entire contents of which are incorporated herein by reference.

FIELD

The embodiment discussed herein is related to an information processing apparatus, an information processing method, and a recording medium.

BACKGROUND

There is an existing case where identification is performed for logging into services via the Internet, such as online banking or net shopping.

Japanese Laid-open Patent Publication No. 2009-118110 is an example of related art.

"FIDO Alliance", [Online], [searched on Nov. 22, 2018], Internet <https://fidoalliance.org/specifications/overview/> and "FIDO Alliance", [Online], [searched on Nov. 22, 2018], Internet <https://fidoalliance.org/fido2/> are an example of related art.

SUMMARY

According to an aspect of the embodiments, an information processing apparatus includes: a memory; and a processor coupled to the memory and configured to: generate, when a browser is coupled to an authenticator, unique identification information by using information acquired from the browser; verify, by referring to a first list storing identification information of a browser permitted to be coupled, whether or not the identification information is stored in the first list, store a verification result in the memory while linking with the identification information, and transmit a verification completion notification to the browser; acquire, by receiving unique identification information generated by the authenticator using the information acquired from the browser, the verification result linked with the identification information from the memory; and transmit the acquisition result to the authenticator that controls coupling propriety with the browser.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9A is a diagram illustrating a port number and address information of a Platform application side (server side of inter-process communication), FIG. 9B is a diagram illustrating a port number and address information of a Polyfill side (client side of inter-process communication), and FIG. 9C is a diagram illustrating TCP coupling list information;

FIG. 20 is a diagram illustrating an example of a log according to the second modification.

DESCRIPTION OF EMBODIMENTS

For example, new online authentication technology using biometric authentication or the like is being standardized by Fast Identity Online Alliance (FIDO Alliance), and is adopted in online banking services and the like. In the authentication method for which standardization is advanced by the FIDO Alliance, secure authentication is realized, by a combination of local authentication using biometric information or the like and signature verification by public key cryptography via a network, without flowing confidential information such as the biometric information to the Internet. The local authentication means authentication performed, while holding registration data in an external authenticator (local) such as a terminal or a smartphone used by a user, in the terminal or the external authenticator.

For example, when accessing an authenticator from the JavaScript (registered trademark) of a browser to perform biometric authentication in authentication compliant with FIDO 2.0, it is possible to be coupled to the authenticator via a bridge interface such as Universal Serial Bus (USB)/Bluetooth (registered trademark) Low Energy (BLE)/Near Field Communication (NFC) using a Client-to-Authenticator Protocol (CTAP).

However, when the browser is coupled to the authenticator via the bridge interface as described above, a malicious application may access and attack the authenticator by the CTAP protocol. To suppress this, it is possible to request PIN input from the user at the time of CTAP coupling to authenticate a coupling source, but there is a risk that the convenience of the user may be reduced due to increase in time and effort.

In one aspect, an information processing apparatus, an inform ion processing method, and a recording medium, capable of suppressing an authenticator from being coupled from an unauthorized program may be provided.

Figure 1:
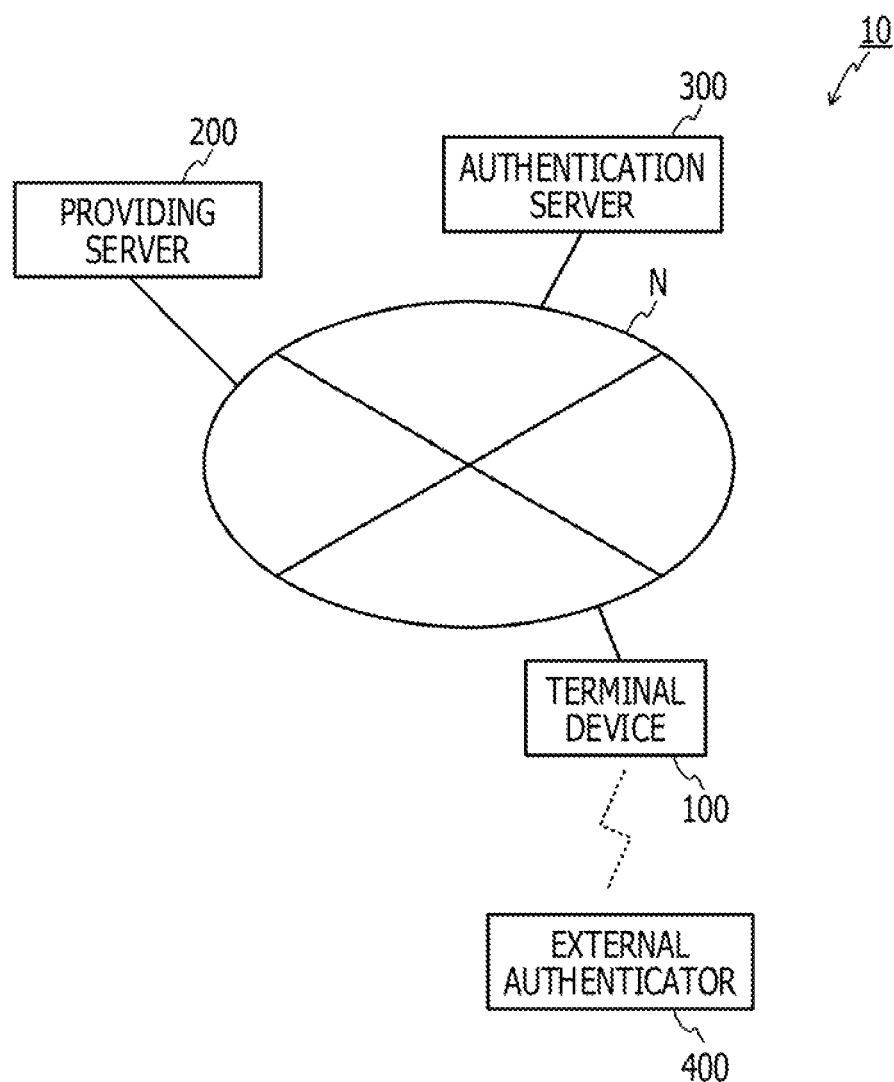
FIG. 1 is a diagram schematically illustrating a configuration of n authentication system according to an embodiment.

An authentication system according to an embodiment will be described below in detail with reference to FIG. 1 to FIG. 12B. FIG. 1 is a diagram illustrating an example of a configuration of an authentication system 10 according to an embodiment.

As illustrated in FIG. 1, the authentication system 10 of the embodiment includes a terminal device 100 as an information processing apparatus, an external authenticator 400, a providing server 200, and an authentication server 300. In the authentication system 10, the number of terminal devices 100, external authenticators 400, providing servers 200, and authentication servers 300 is not limited, and the arbitrary number of terminal devices 100, external authenticators 400, providing servers 200, and authentication servers 300 may be included. The terminal device 100 and the providing server 200 are, the terminal device 100 and the authentication server 300 are, and the providing server 200 and the authentication server 300 are communicably coupled to each other via a network N. As the network N, any type of communication network such as a local area network (LAN) and a virtual private network (VPN) which may be wired or wireless as well as the Internet may be adopted. Communication performed via the network N may be encrypted by, for example, Transport Layer Security (TLS)/Secure Sockets Layer (SSL) or the like. The terminal device 100 and the external authenticator 400 are coupled to each other through near-field communication (NFC), Bluetooth (registered trademark) Low Energy (BLE), Universal Serial Bus (USB), or the like.

The authentication system 10 is one example of a system in which, when using a service provided by the providing server 200 in the terminal device 100, biometric information is collated in the external authenticator 400 to perform user authentication processing, and an authentication result thereof is transmitted to the authentication server 300 via the terminal device 100, whereby user authentication of the terminal device 100 is performed. The terminal device 100 is an information processing apparatus for the user to use the service provided by the providing server 200. It is assumed that the terminal device 100 is, for example, a stationary personal computer or the like which does not include a biometric sensor or the like and the external authenticator 400 is, for example, a smartphone having a fingerprint sensor or the like.

Figure 2:
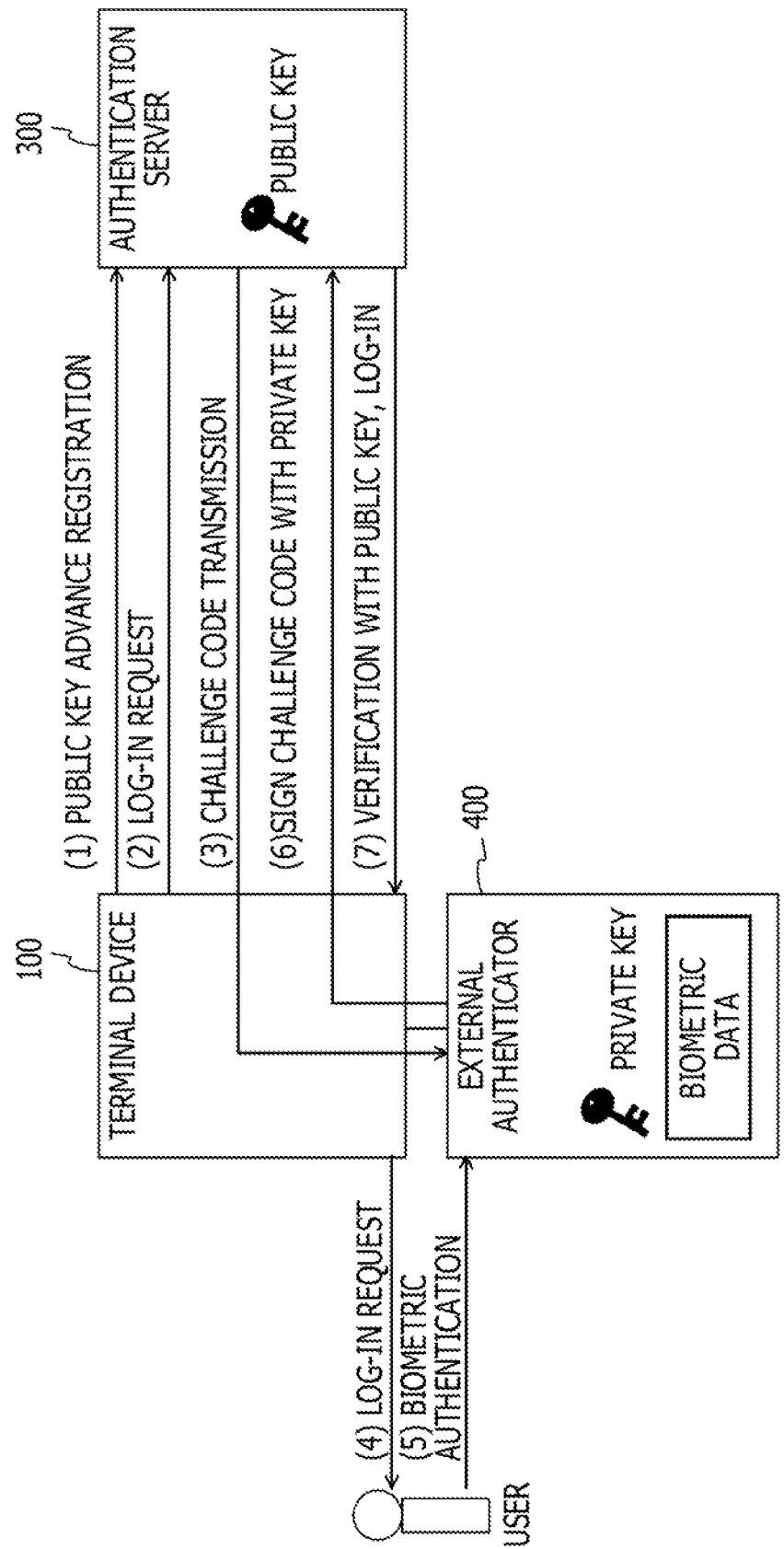
FIG. 2 is a diagram illustrating user authentication processing performed by an authentication system according to an embodiment.

FIG. 2 is a diagram illustrating user authentication processing performed by the authentication system 10. As illustrated in FIG. 2, in the authentication system 10, (1) the external authenticator 400 generates a new key pair (public key, private key) at the time of registration to an online service, the private key is held by the external authenticator 400, and the public key is registered in the authentication server 300 in advance. Next, (2) when a log-in request is made from the terminal device 100, (3) the authentication server 300 transmits a challenge code to the external authenticator 400 via the terminal device 100. Next, (4) when the terminal device 100 issues a log-in request to the user, (5) the user performs biometric authentication using a fingerprint sensor or the like of the external authenticator 400. At this time, the external authenticator 400 performs authentication (local authentication) by using biometric data held in the external authenticator 400, and in a case where the authentication is successful, (6) signs the challenge code with the private key, and transmits the challenge code with the signature to the authentication server 300 via the terminal device 100. (7) The authentication server 300 performs authentication by verifying the challenge code with the signature with the public key, and in a case where the authentication is successful, permits log-in of the user. In the embodiment, since the user authentication processing as described above is performed, it is not required to flow confidential information such as biometric information through the network N, and thus secure authentication may be performed.

The authentication system 10 of the embodiment has a function of suppressing access to the external authenticator 400 from an unauthorized program (application) installed in the terminal device 100, separately from the function of performing the user authentication processing described above. Hereinafter, the function of suppressing the access to the external authenticator 400 from the unauthorized program will be mainly described.

Figure 3:
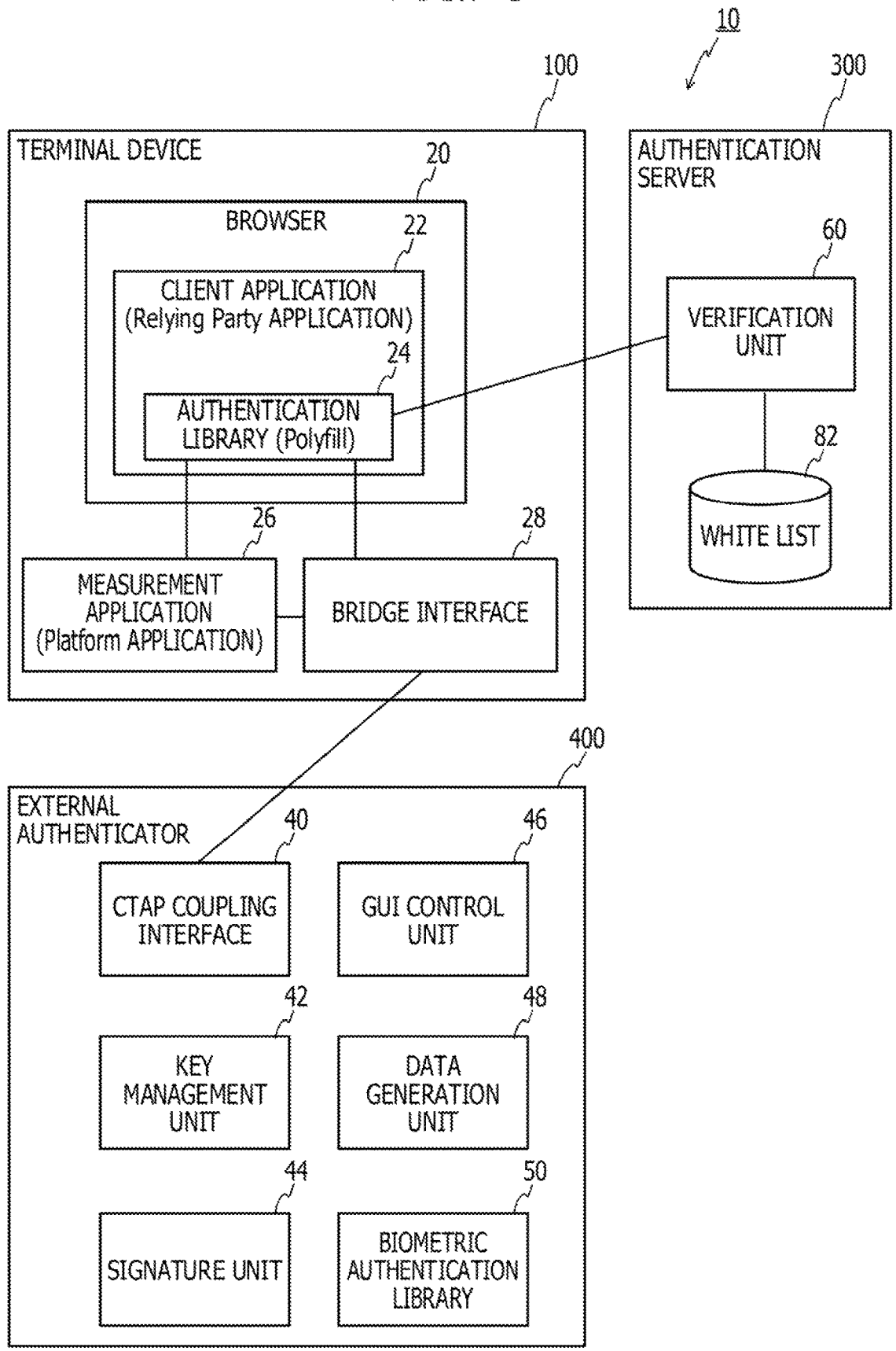
FIG. 3 is a diagram illustrating a configuration of each device included in the authentication system.

FIG. 3 illustrates a configuration of each device included in the authentication system 10. As illustrated in FIG. 3, in the terminal device 100, for example, a client application (Relying Party application) 22 of the JavaScript or the like acquired by a browser 20 from the providing server 200 is executed on the browser 20. The Relying Party application 22 includes an authentication library (Polyfill) 24 by the JavaScript or the like, and the Polyfill 24 performs interprocess communication with a measurement application (Platform application) 26 operating on an operating system (OS). The Platform application 26 controls coupling to the external authenticator 400 via a bridge interface 28 using information acquired from an API (Platform API) of the OS.

The external authenticator 400 includes a CTAP coupling interface 40, a key management unit 42, a signature unit 44, a graphical user interface (GUI) control unit 46, a data generation unit 48, and a biometric authentication library 50.

The CTAP coupling interface 40 is coupled to the terminal device 100 through the bridge interface 28 using the CTAP protocol. The CTAP protocol is a protocol, which is adopted from the FIDO 2.0, for accessing an authenticator.

The key management unit 42 manages the private key. The key management unit 42 may, as the private key, separately manage a private key used for the above-described authentication processing (FIG. 2) and a private key used to suppress access to the external authenticator 400, or may manage a common private key usable for each processing.

The signature unit 44 executes signature processing when caller application information is transmitted together with a signature request from the bridge interface 28. In this signature processing, the signature unit 44 uses the private key managed by the key management unit 42. In the user authentication processing (FIG. 2), when the authentication OK determination is made by the data generation unit 48, which will be described later, the signature unit 44 attaches a signature to the challenge code using the private key for authentication managed by the key management unit 42. The signature unit 44 transmits the challenge code with the signature to the authentication server 300 via the terminal device 100.

The GUI control unit 46 displays an input dialog for the biometric authentication. The data generation unit 48 generates collation data from the image acquired from a biometric sensor. In the user authentication processing (FIG. 2), the data generation unit 48 compares biometric data stored in the biometric authentication library 50 and the generated collation data with each other, and determines authentication OK/NG.

The providing server 200 is a server that provides various services. When receiving a service request from the terminal device 100, the providing server 200 transmits a Web application to the terminal device 100, and provides various services to the user after the user authentication by the authentication server 300.

The authentication server 300 is a server for processing an authentication request received from the terminal device 100. The authentication server 300 includes a verification unit 60 illustrated in FIG. 3. When acquiring information with the signature from the external authenticator 400 via the terminal device 100, the verification unit 60 executes verification using the public key, and transmits the verification result to the terminal device 100. In the terminal device 100, when the verification result that the browser to be coupled to the external authenticator 400 is appropriate is obtained, the terminal device 100 is notified that access to the external authenticator 400 from the browser 20 is permitted. With this, the access to the external authenticator 400 from the unauthorized program is controlled. The authentication server 300 may, as the public key, separately manage a public key used for the above-described authentication processing (FIG. 2) and a public key used to suppress the unauthorized access to the external authenticator 400, or may manage a common public key usable for each processing.

Figure 4:
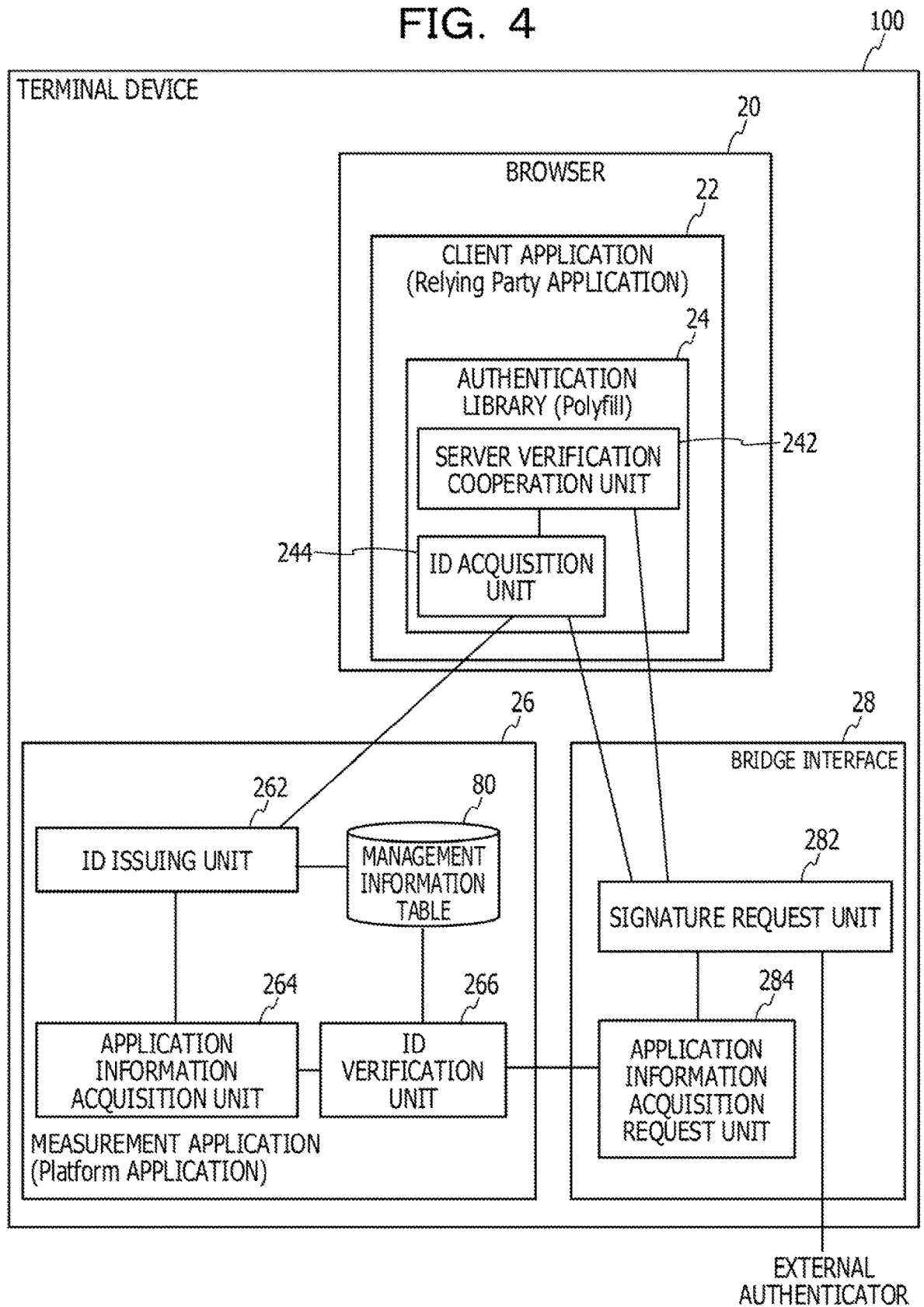
FIG. 4 is a functional block diagram of a terminal device.

FIG. 4 illustrates a functional block diagram of the terminal device 100. As illustrated in FIG. 4, the Polyfill 24 includes a server verification cooperation unit 242 as a transmission unit, and an ID acquisition unit 244. The Platform application 26 includes an ID issuing unit 262 as a management unit, an application information acquisition unit 264, and an ID verification unit 266 as an acquisition unit. The bridge interface 28 includes a signature request unit 282 as a request unit, and an application information acquisition request unit 284.

The server verification cooperation unit 242 exchanges information in cooperation with the verification unit 60 of the authentication server 300.

When the browser 20 is coupled to the external authenticator 400, the ID acquisition unit 244 exchanges information with the Platform application 26, and acquires an identity certification ID issued by the ID issuing unit 262 of the Platform application 26. The ID acquisition unit 244 transmits a signature request to the signature request unit 282 of the bridge interface 28 by using the acquired identity certification ID.

The ID issuing unit 262 acquires a process ID of the browser 20, ands transmits the process ID to the application information acquisition unit 264. The ID issuing unit 262 issues an identity certification ID based on information (process name) of the caller application transmitted from the application information acquisition unit 264, and notifies the ID acquisition unit 244 thereof. The ID issuing unit 262 manages the identity certification ID, the process name, and the process ID in a management information table 80 as a storage unit illustrated in FIG. 10A.

The application information acquisition unit 264 acquires the caller application information (process name) based on the process ID received from the ID issuing unit 262, and notifies the ID issuing unit 262 thereof.

When receiving the acquisition request of the caller application information (process name) from the application information acquisition request unit 284 of the bridge interface 28, the ID verification unit 266 refers to the management information table 80 and verifies the identity certification ID included in the acquisition request. The ID verification unit 266 acquires the process name corresponding to the identity certification ID from the management information table 80, acquires application information (front display application information) that is being executed at the forefront surface of the terminal device 100, and notifies the application information acquisition request unit 284 thereof.

When the signature request using the identity certification ID from the ID acquisition unit 244 is received, the signature request unit 282 transmits the identity certification ID to the application information acquisition request unit 284, and performs an acquisition request of the caller application information (process name). When the process name corresponding to the identity certification ID and the front display application information are acquired from the application information acquisition request unit 284, the signature request unit 282 notifies the signature unit 44 of the external authenticator 400 of the process name and the front display application information. When the process name with the signature and the front display application information with the signature, which are signed in the signature unit 44, are received, the signature request unit 282 transmits the received information to the server verification cooperation unit 242.

When the acquisition request of the caller application information (process name) with the identity certification ID is received from the signature request unit 282, the application information acquisition request unit 284 notifies the ID verification unit 266 of the identity certification ID. When the process name corresponding to the notified identity certification ID and the front display application information are acquired from the ID verification unit 266, the application information acquisition request unit 284 transmits the process name and the front display application information to the signature request unit 282.

(Access Control to External Authenticator 400 in Authentication System 10)

Access control to the external authenticator 400 in the authentication system 10 will be described below in detail with reference to FIG. 5 to FIG. 8. Processing in FIG. 5 to FIG. 8 is processing executed in a timing before the terminal device 100 and the external authenticator 400 are coupled to each other (before (3) in FIG. 2).

Figure 5:
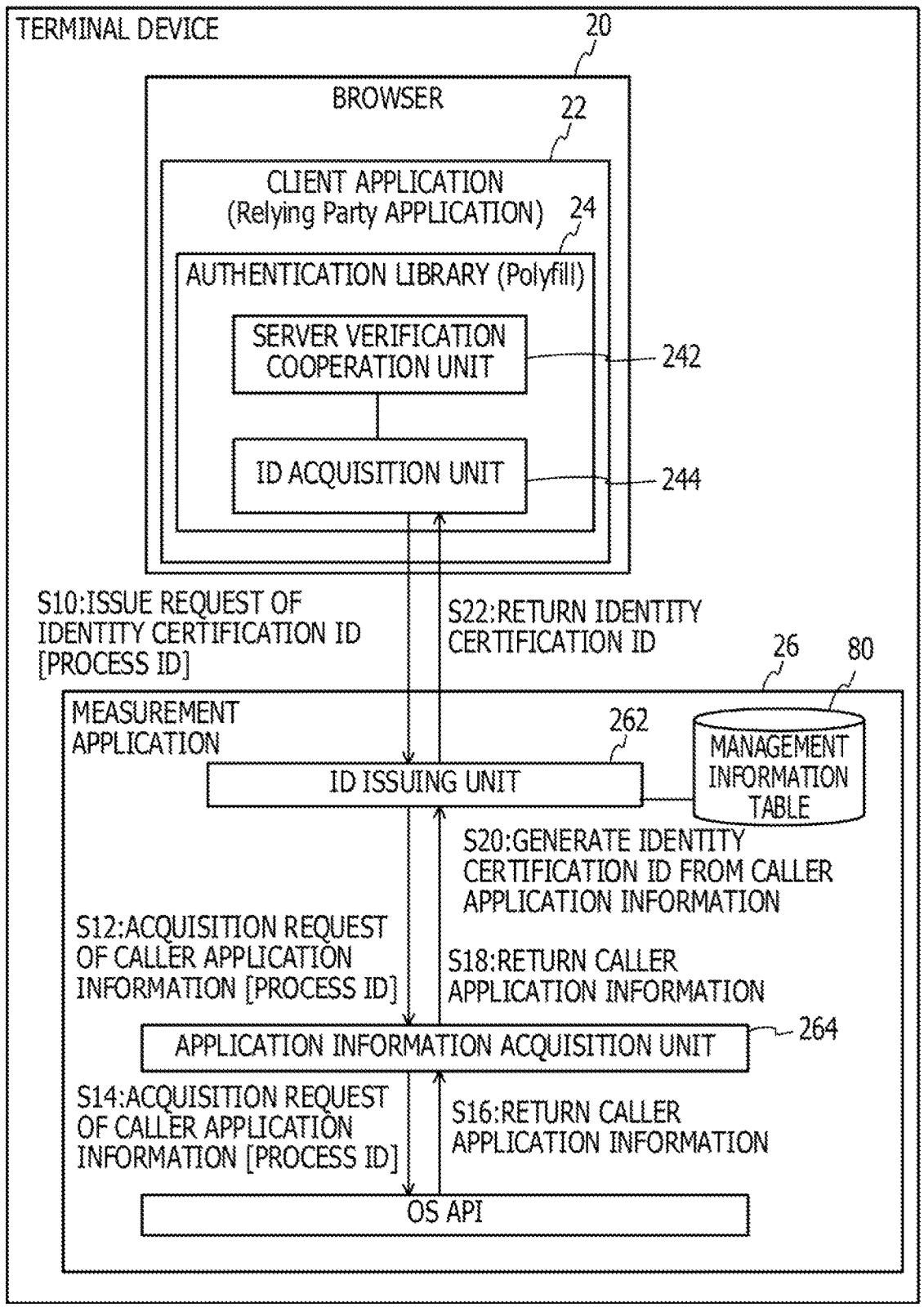
FIG. 5 is a diagram illustrating a procedure (part 1) of access control processing.

FIG. 5 illustrates a procedure (part 1) of the access control processing.

In the processing illustrated in FIG. 5, first, the ID acquisition unit 244 of the Polyfill 24 executes a request to issue the identity certification ID to the ID issuing unit 262 of the Platform application 26 (SW). At this time, the ID issuing unit 262 acquires the process ID of the caller application (browser 20). In a case of acquiring the process ID, when the Platform application 25 establishes inter-process communication with the Polyfill 24 by socket communication using Winsock, the ID issuing unit 262 acquires a port number and address information of the Platform application 26 side (server side of inter-process communication) illustrated in FIG. 9A. The ID issuing unit 262 acquires a port number and address information of the Polyfill 24 side (client side of inter-process communication) illustrated in FIG. 9B. The process ID is acquired by referring to TCP coupling list information illustrated in FIG. 9C.

The TCP coupling list information in FIG. 9C includes the number of TCP couplings of the Platform application 26, the port number and address information of the server and the port number and address information of the client of the inter-process communication, and the process ID of the coupling source application. In the example illustrated in FIG. 9C, although not illustrated, it is assumed that 69 combinations of the port number and address information of the server and the port number and address information of the client of the inter-process communication, and the process ID of the coupling source application are stored.

The ID issuing unit 262 acquires the process ID of the TCP coupling including the information acquired in FIG. 9A and FIG. 9B from the TCP coupling list information. In the example illustrated in FIG. 9A to FIG. 9C, the ID issuing unit 262 may acquire the process ID=13332 of the coupling source application (browser 20).

Next, the ID issuing unit 262 transmits an acquisition request of the caller application information together with the acquired process ID to the application information acquisition unit 264 (S12).

Next, the application information acquisition unit 264 acquires the caller application information (process name) corresponding to the received process ID by using the OS API (S14, S16). In this case, the application information acquisition unit 264 acquires a process name (for example, chrome.exe) corresponding to the process ID by using, for example, a process information acquisition API (PSAPI) of Windows (registered trademark).

Next, the application information acquisition unit 264 returns the acquired caller application information (process name) to the ID issuing unit 262 (S18). The ID issuing unit 262 generates the identity certification ID from the caller application information (process name) (S20). Specifically, for example, the ID issuing unit 262 generates a unique identity certification ID by using the acquired process name and a random number generation function. The ID issuing unit 262 manages the identity certification ID, the process ID, and the process name in the management information table 80 illustrated in FIG. 10A in a linked manner. In the management information table 80 illustrated in FIG. 10A, the identity certification ID, the process ID, and the process name are managed in association with one another. In the example illustrated in FIG. 10A, the identity certification ID "12345", the process ID "13332", and the process name "chrome.exe" are associated with one another.

Thereafter, the ID issuing unit 262 returns the generated identity certification ID to the ID acquisition unit 244 of the Polyfill 24 (S22). After the processing in FIG. 5 is performed, the process proceeds to processing illustrated in FIG. 6.

Figure 6:
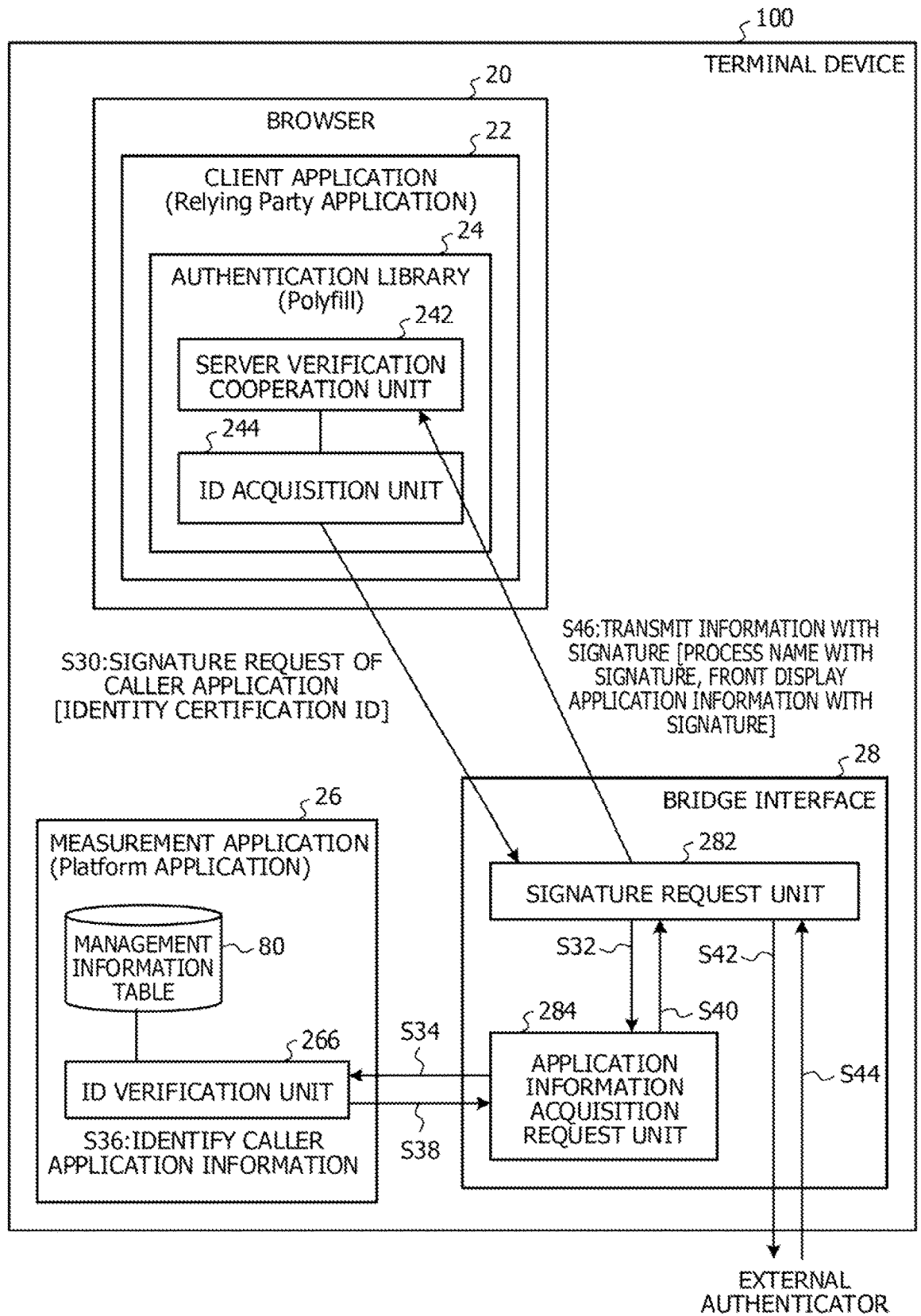
FIG. 6 is a diagram illustrating a procedure (part 2) of the access control processing.

FIG. 6 illustrates a procedure (part 2) of the access control processing.

As described above, when the ID acquisition unit 244 of the Polyfill 24 receives the identity certification ID from the ID issuing unit 262 (S22 in FIG. 5), the ID acquisition unit 244 transmits the identity certification ID (=12345) to the signature request unit 282 of the bridge interface 28. With this, the ID acquisition unit 244 performs a signature request of the caller application (S30).

Next, the signature request unit 282 transmits the identity certification ID (=12345) to the application information acquisition request unit 284 to perform the acquisition request of the caller application information (S32). The application information acquisition request unit 284 transmits the identity certification ID (=12345) to the ID verification unit 266 of the Platform application 26 to perform the acquisition request of the caller application information (S34).

When acquiring the identity certification ID (=12345), the ID verification unit 266 identifies the caller application information (S36). At this time, the ID verification unit 266 verifies whether or not the identity certification ID (=12345) is the ID issued by itself by using the management information table 80 illustrated in FIG. 10A. When it may be confirmed that the received identity certification ID is present in the management information table 80, the ID verification unit 266 acquires information of the process name (chrome.exe) corresponding to the identity certification ID and a window (application) arranged at the forefront surface in the Windows desktop environment. Hereinafter, information of an application arranged at the forefront surface is referred to as "front display application information". When the front display application information is acquired, the ID verification unit 266 acquires a unique identifier (window handle) when the window is switched in the Windows desktop environment, and acquires the application name of the forefront surface based on the window handle. It is assumed that "chrome.exe" is acquired as the front display application information. When the process name and the front display application information are acquired, the ID verification unit 266 returns the process name and the front display application information to the application information acquisition request unit 284 of the bridge interface 28 (S38).

When the process name and the front display application information are received, the application information acquisition request unit 284 transmits the process name and the front display application information to the signature request unit 282 (S40).

Next, the signature request unit 282 is coupled to the external authenticator 400 which is coupled through the BLE, for example, by the CTAP communication of the FIDO, transmits the process name and the front display application information to the signature unit 44 of the external authenticator 400, and executes the signature request (S42). At this time, the signature unit 44 executes the signature for the process name (chrome.exe) and the front display application information (chrome.exe) by using the private key managed by the key management unit 42, and returns the process name with the signature and the front display application information with the signature to the signature request unit 282 (S44).

When the process name with the signature and the front display application information with the signature are received, the signature request unit 282 transmits the received information to the server verification cooperation unit 242 of the Polyfill 24 (S46). When the processing illustrated in FIG. 6 is completed as described above, the process proceeds to processing illustrated in FIG. 7.

Figure 7:
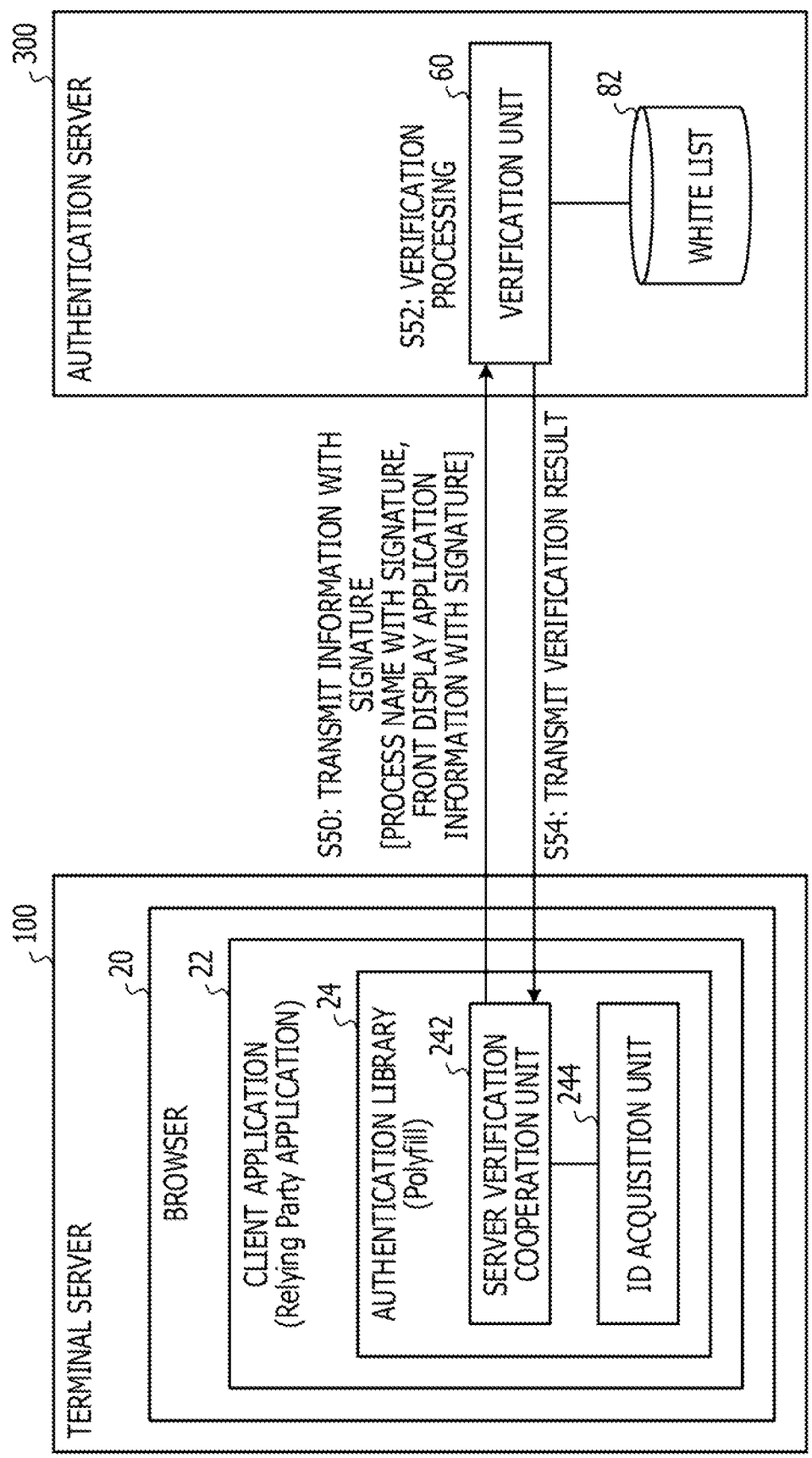
FIG. 7 is a diagram illustrating a procedure (part 3) of the access control processing.

FIG. 7 illustrates a procedure (part 3) of the access control processing.

In the processing illustrated in FIG. 7, the server verification cooperation unit 242 of the Polyfill 24 transmits the process name with the signature and the front display application information with the signature received from the signature request unit 282 to the verification unit 60 of the authentication server 300 (S50).

When the process name with the signature and the front display application information with the signature are received, the verification unit 60 executes the verification processing (S52). In the verification processing, the verification unit 60 executes processing in accordance with the flowchart of FIG. 8.

Figure 8:
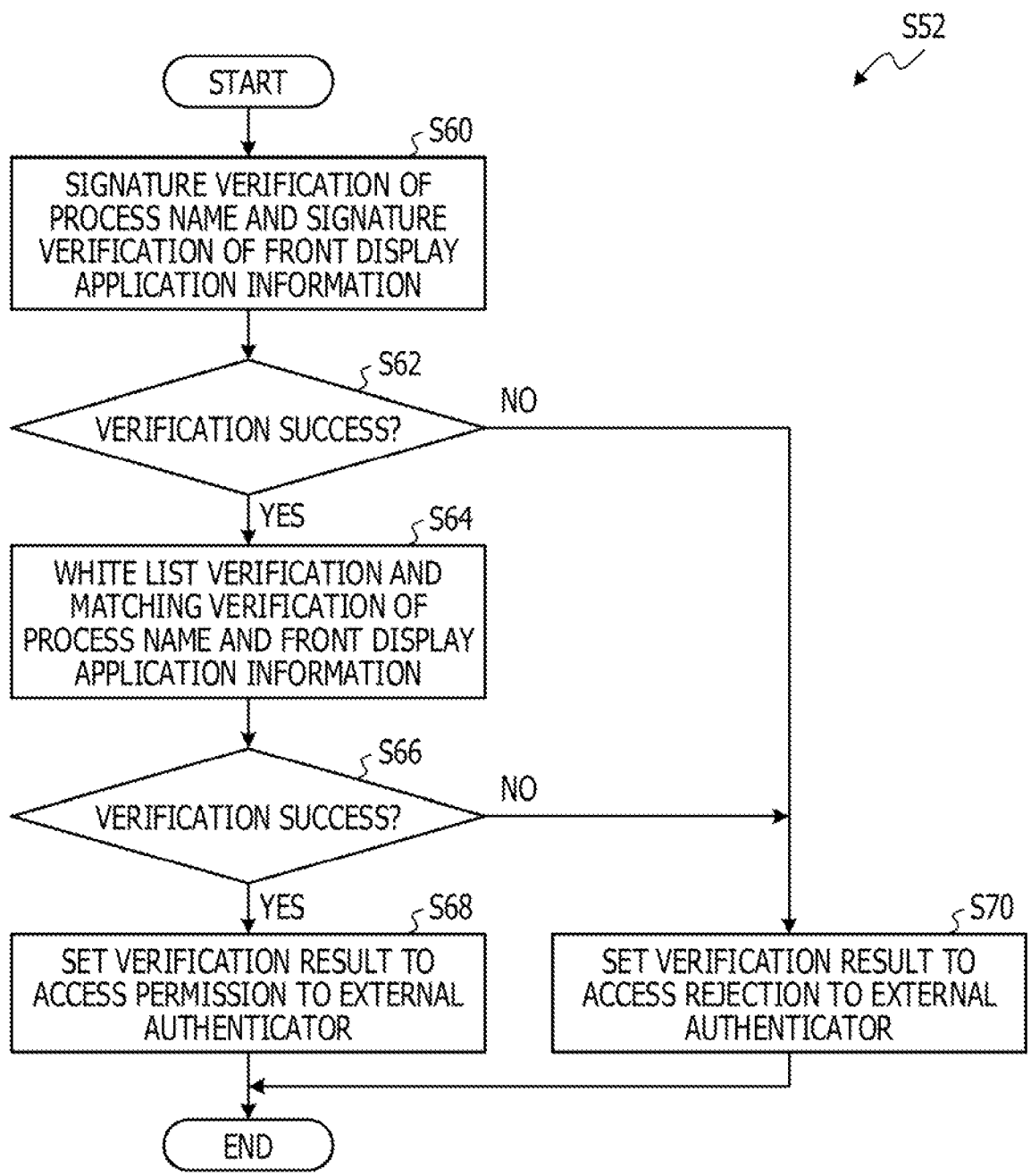
FIG. 8 is a flowchart illustrating verification processing (S52) executed by a verification unit.
Figure 10A:
FIG. 10A is a diagram illustrating a management information table.
Figure 10B:
FIG. 10B is a diagram illustrating a white list.

In the processing in FIG. 8, first, in step S60, the verification unit 60 executes signature verification of the process name (chrome.exe) and signature verification of the front display application information (chrome.exe) by using the public key.

Next, in step S62, it is determined whether or not the verification unit 60 succeeds in the verification. When the determination in step S62 is affirmed, the process proceeds to step S64.

When proceeding to step S64, the verification unit 60 executes the white list verification and matching verification of the process name and the front display application information. In the white list verification, the verification unit 60 refers to a white list 82 (FIG. 10B) to verify whether or not the process name (chrome.exe) is included in the white list 82. The white list 82 is a list in which a name (application name) of an application (browser) permitted to be coupled to the external authenticator 400 is registered in advance. In the matching verification, the verification unit 60 verifies whether or not the process name (chrome.exe) and the front display application name (chrome.exe) are identical to each other. The information used by the verification unit 60 in the verification is not limited to the process name. For example, the verification unit 60 may manage a version of the browser, a tab name of the browser, or the like, in the white list, and verify whether or not the version of the currently displayed browser or the tab name of the browser is included in the white list. By doing so, it is possible to further enhance accuracy of the verification.

Next, in step S66, it is determined whether or not the verification unit 60 succeeds in the verification. In step S66, when both the white list verification and the matching verification are successful, the determination is affirmed. When the determination in step S66 is affirmed, the verification unit 60 proceeds to step S68.

When proceeding to step S68, the verification unit 60 sets the verification result to an access permission to the external authenticator 400.

On the other hand, in a case where the determination in step S62 or step S66 is denied, the process proceeds to step S70. In step S70, the verification unit 60 sets the verification result to an access rejection to the external authenticator 400.

After the processing in step S68 or step S70 is performed, the entire processing in FIG. 8 is completed.

Returning to FIG. 7, when the verification processing (S52) is completed as described above, the verification unit 60 transmits the verification result to the server verification cooperation unit 242 (S54). For example, when the server verification cooperation unit 242 receives the verification result (access permission), the access to the external authenticator 400 from the browser 20 is permitted by the bridge interface 28. On the other hand, when the server verification cooperation unit 242 receives the verification result (access rejection), the access to the external authenticator 400 from the browser 20 is rejected by the bridge interface 28. In this way, in the embodiment, the bridge interface 28 functions as a control unit that controls coupling propriety between the browser 20 and the external authenticator 400.

Each part illustrated in the drawings in the embodiment may not be required to be physically configured as illustrated in the drawings. That is, for example, specific forms of dispersion and integration of the parts are not limited to those illustrated in the drawings, and all or part thereof may be configured by being functionally or physically dispersed or integrated in given units according to various loads, the state of use, and the like. For example, the server verification cooperation unit 242 and the ID acquisition unit 244 may be integrated, or the ID issuing unit 262, the application information acquisition unit 264, and the ID verification unit 266 may be integrated. The order of processing illustrated in the drawings is not limited to the order described above, and the processing may be simultaneously performed or the order may be switched within the range in which the processing contents do not contradict one another.

All or any of the various processing functions performed in the devices may be performed on a central processing unit (CPU) (or a microcomputer, such as a microprocessor unit (MPU) or a micro controller unit (MCU)). Needless to say, all or given some of the various processing functions may be executed with a program analyzed and executed by a CPU (or a microcomputer such as an MPU or an MCU) or with hardware using wired logic.

Figure 11:
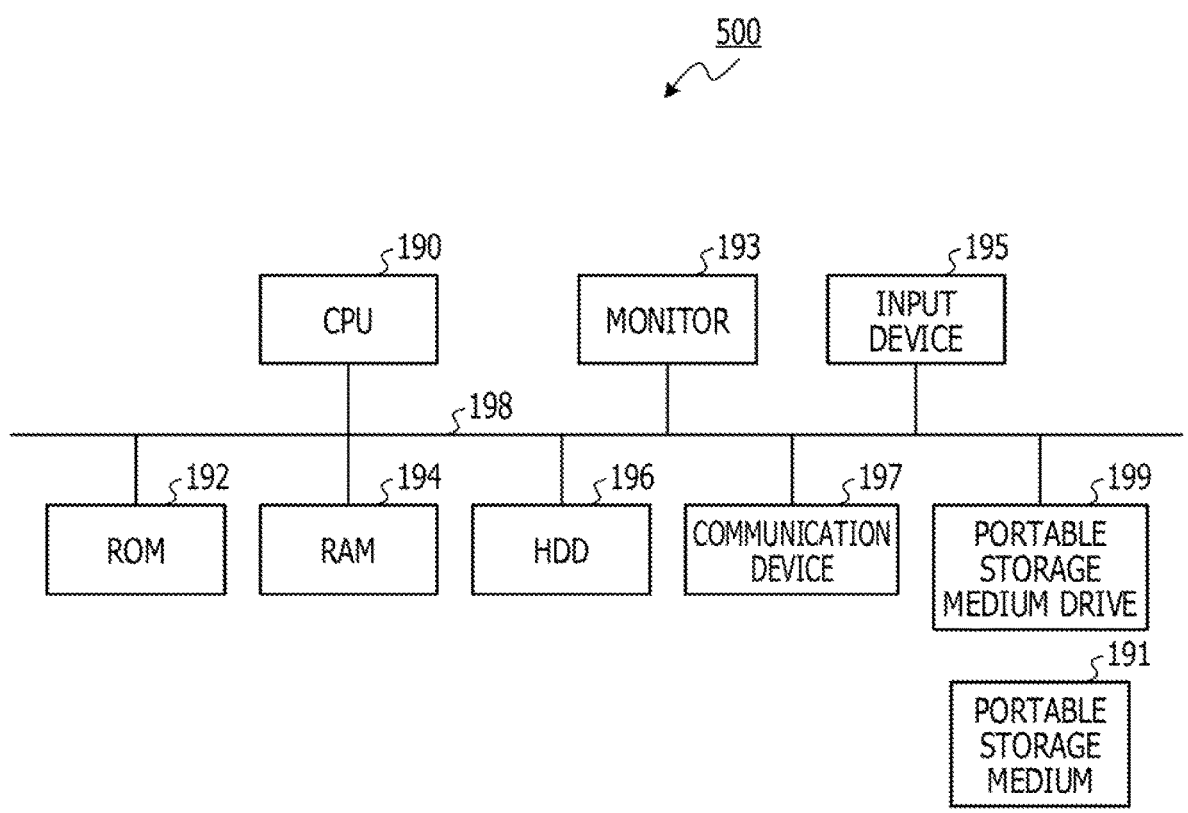
FIG. 11 is a diagram illustrating an example of a computer that executes an information processing program.

Various processes described in the embodiments may be implemented by executing programs prepared in advance by a computer. In the following, an example of a computer that executes a program having the same function as in the embodiment is described. FIG. 11 is a diagram illustrating the example of a computer 500 that executes an information processing program.

As illustrated in FIG. 11, the computer 500 includes a CPU 190 that executes various kinds of arithmetic processing, an input device 195 that receives data input, and a monitor 193. The computer 500 includes a portable storage medium drive 199 for reading a program or the like from a portable storage medium, and a communication device 197 for wired or wireless coupling to other information processing apparatuses or the like. The computer 500 includes a read-only memory (ROM) 192, a random-access memory (RAM) 194, and a hard disk drive (HDD) 196. Each of these devices included in the computer 500 is coupled to a bus 198.

The ROM 192 stores an information processing program having the same function as that of each part of the terminal device 100 illustrated in FIG. 4. The ROM 192 stores the management information table 80 and various data for implementing the information processing program. The input device 195 receives, for example, input of various kinds of information such as operational information from a user of the computer 500. The monitor 193 displays, for example, various screens such as a display screen for the user of the computer 500. The communication device 197 is coupled to, for example, the network N and exchanges various kinds of information with the providing server 200, the authentication server 300, and other information processing apparatuses. The communication device 197 is coupled to the external authenticator 400.

The CPU 190 reads the programs stored in the ROM 192, loads the programs to the RAM 194, and executes the programs to perform various kinds of processing. These programs may cause the computer 500 to function as each part of the terminal device 100 illustrated in FIG. 4.

The information processing program described above is not required to be stored in the ROM 192. For example, the computer 500 may read and execute the program stored in a portable storage medium 191 that is readable by the computer 500. Examples of the portable storage medium include a compact disc (CD)-ROM, a digital versatile disc (DVD), a USB memory, and the like. This information processing program may be stored in devices coupled to a public network, the Internet, a LAN, and the like, and the computer 500 may read and execute the information processing program therefrom.

As described in detail above, according to the embodiment, when the browser 20 coupled to the external authenticator 400 via the bridge interface, the ID issuing unit 262 acquires the information (process ID and process name) of the browser 20. The ID issuing unit 262 generates the identity certification ID from the acquired process name, transmits the generated identity certification ID to the ID acquisition unit 244, and manages the generated identity certification ID and the process ID and the process name of the browser 20 in the management information table 80 in association with one another. When the identity certification ID is acquired from the browser 20 via the bridge interface 28, the ID verification unit 266 refers to the management information table 80 to acquire the process name corresponding to the identity certification ID and the front display application information. The signature request unit 282 transmits the process ID and the front display application information acquired by the ID verification unit 266 to the external authenticator 400 to make the signature request. The server verification cooperation unit 242 acquires, via the bridge interface 28, the process name with the signature and the front display application information with the signature from the external authenticator 400, and transmits the process name with the signature and the front display application information with the signature to the authentication server 300. The bridge interface 28 controls coupling propriety between the browser 20 and the external authenticator 400 based on the authentication result by the authentication server 300. That is, for example, in the embodiment, when a signature request is issued from the browser 20 that has received issue of the identity certification ID, a signature is performed on the process name of the browser and the front display application information by the external authenticator 400. As a result of verifying the process name with the signature and the front display application information with the signature by the authentication server 300, in a case where it is determined that the coupling may be permitted to be established, the access to the external authenticator 400 is permitted from the browser 20. Accordingly, in the embodiment, a trust relationship is established at the location indicated by the double-headed arrow in FIG. 12A, and a trust relationship between the authentication library (Polyfill) 24 of the browser 20 and the external authenticator 400 is established, so that only the browser 20 authenticated by the authentication server 300 may access the external authenticator 400. Therefore, it is possible to suppress an unauthorized application (an application such as a malware that operates in the background) installed in the terminal device 100 from accessing the external authenticator 400. In this case, since PIN input is not required from the user, it is possible to suppress the decrease in the convenience of the user.

Figure 12A:
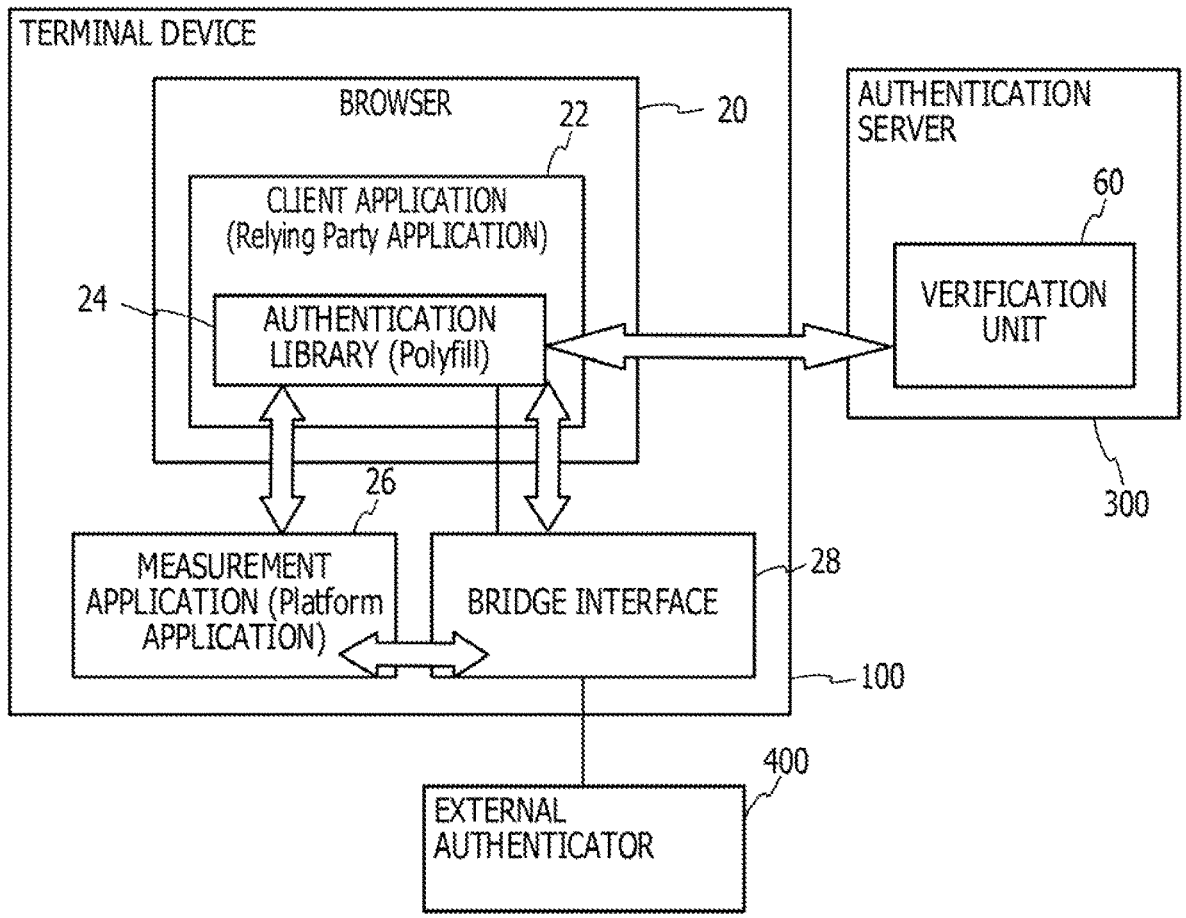
FIG. 12A is a diagram for explaining actions and effects of an embodiment.
Figure 12B:
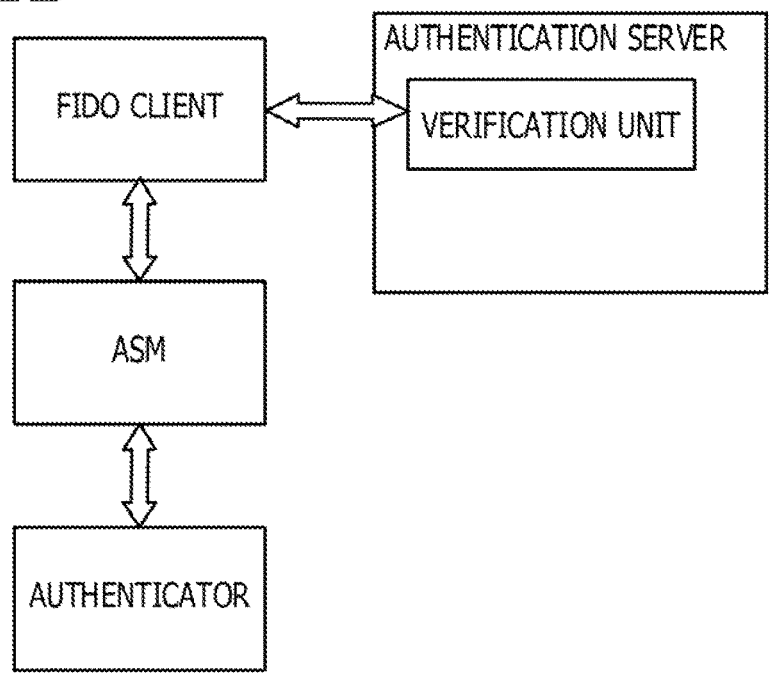
FIG. 12B is a diagram for explaining a comparative example.

As a comparative example, FIG. 12B illustrates an example (FIDO UAF environment) in which an Authenticator Specific Module (ASM) controls coupling between an FIDO client and an authenticator. In this example, browser plug-in of the FIDO client measures a Facet ID and the ASM measures path information. The authenticator signs the Facet ID and the process ID, and the verification unit of the authentication server verifies the data with the signature. However, in a case where the CTAP communication is used for coupling to the external authenticator 400 as in the embodiment, the browser plug-in may not be used, so that the scheme illustrated in FIG. 12B may not be used. In contrast, by adopting the method as in the embodiment, even in the case where the terminal device 100 and the external authenticator 400 perform the CTAP communication, it is possible to limit the access from the unauthorized application.

In the above embodiment, the case where the ID verification unit 266 acquires the front display application information when acquiring the process name corresponding to the identity certification ID in step S36 has been described, but the embodiment is not limited thereto. That is, for example, the ID verification unit 266 may acquire only the process name in step S36. In this case, in the signature unit 44 of the external authenticator 400, a signature for the process name is executed, and in the authentication server 300, the white list verification using the process name with the signature is performed. In a case where this white list verification is successful, the access from the browser 20 to the external authenticator 400 becomes possible. In this manner as well, the same action and effect as those of the above embodiment may be obtained.

In the above embodiment, the case where the external authenticator 400 is a smartphone has been described, but the embodiment is not limited thereto, and other Bluetooth devices, NFC mounted devices, USB tokens, and the like may also be used.

First Modification

Figure 13:
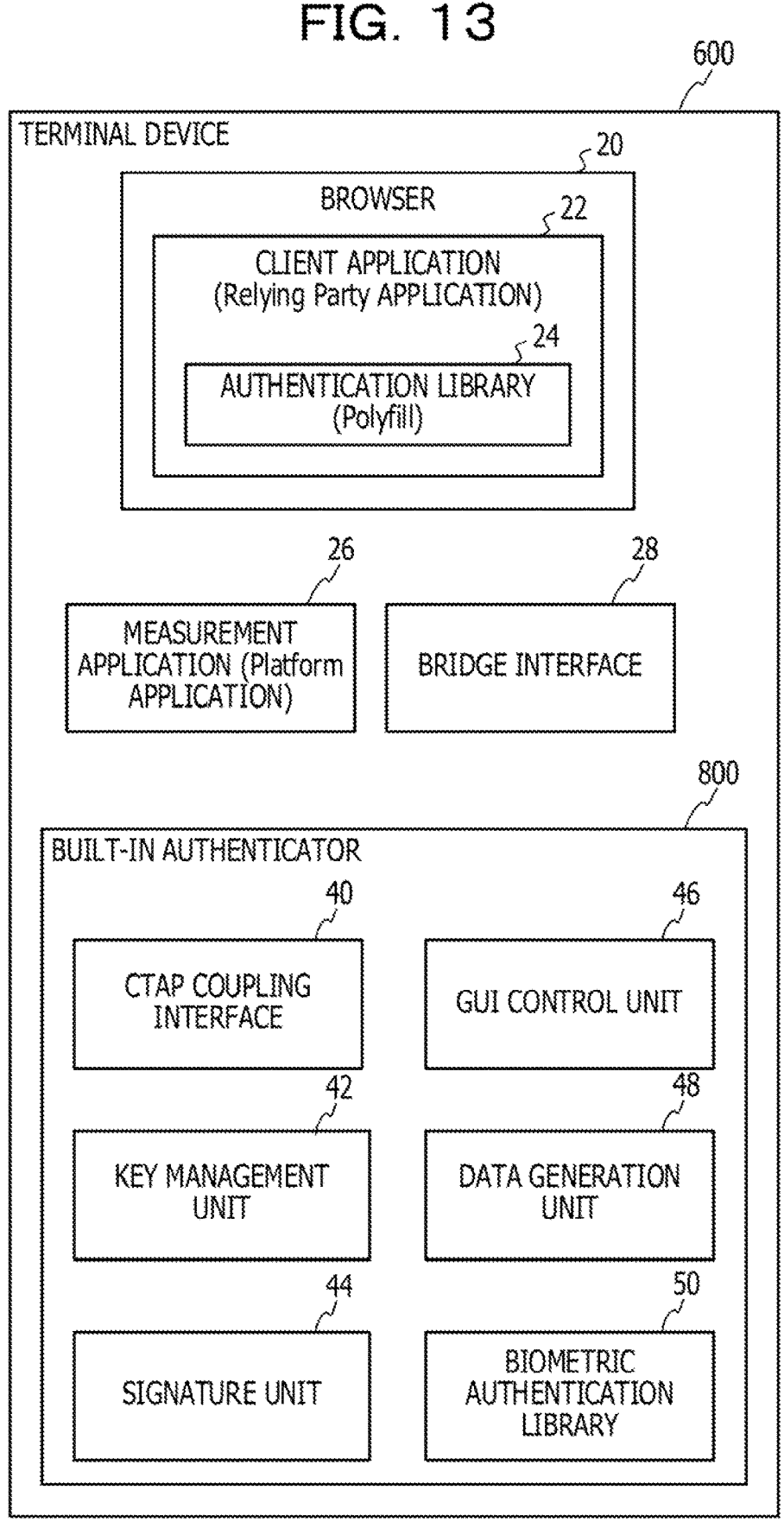
FIG. 13 is a diagram illustrating a first modification.

FIG. 13 illustrates a first modification of the authentication system. In Windows 8.1 or later, a Windows Biometric Framework (WBF) makes it possible to couple to a built-in authenticator. However, in a computer having a WBF non-compliant built-in authenticator, the built-in authenticator is required to be coupled through the bridge interface. FIG. 13 illustrates a terminal device 600 having a built-in authenticator 800 to be coupled by such a bridge interface (28). In the terminal device 600 as described above as well, the Polyfill 24, the Platform application 26, the bridge interface 28, and the signature unit 44 of the built-in authenticator 800 execute the same processing as that of the embodiment described above, thereby making it possible to suppress access to the built-in authenticator 800 from the unauthorized application. Since the processing of each part of the terminal device 600 is the same as that of the embodiment described above, description thereof will not be repeated.

Second Modification

Figure 14:
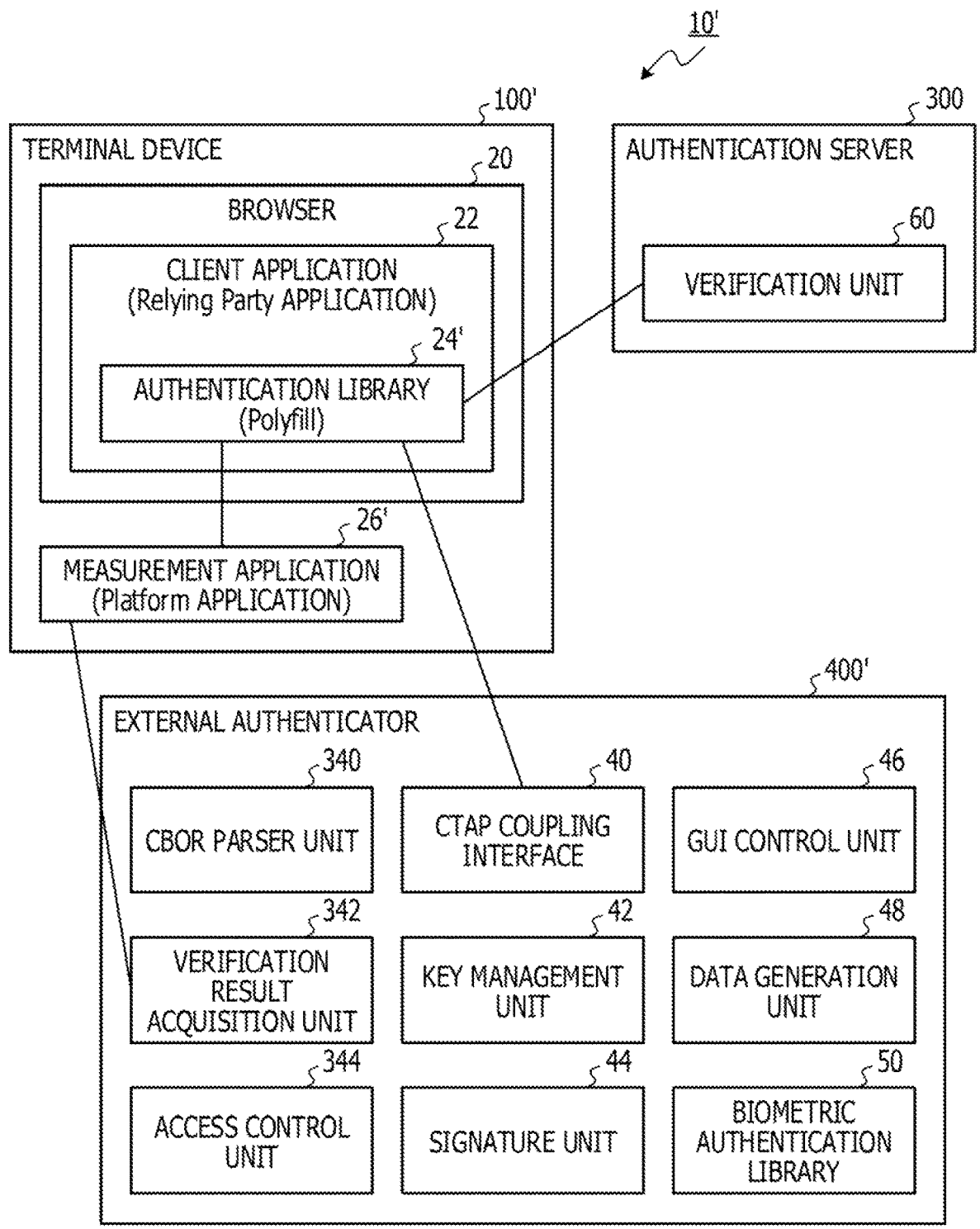
FIG. 14 is a diagram illustrating an authentication system according to a second modification.

FIG. 14 illustrates a second modification of the authentication system. In an authentication system 10' according to the second modification, a measurement application 26' in a terminal device 100' as the information processing apparatus executes the verification of the caller application. In the second modification, as is clear from comparison between FIG. 14 and FIG. 3, the bridge interface is omitted from the terminal device 100'. The authentication server 300 of the second modification does not hold the white list. An external authenticator 400' of the second modification has functions of a CBOR parser unit 340, a verification result acquisition unit 342, and an access control unit 344 in addition to the functions of the external authenticator 400 of FIG. 3.

Figure 15:
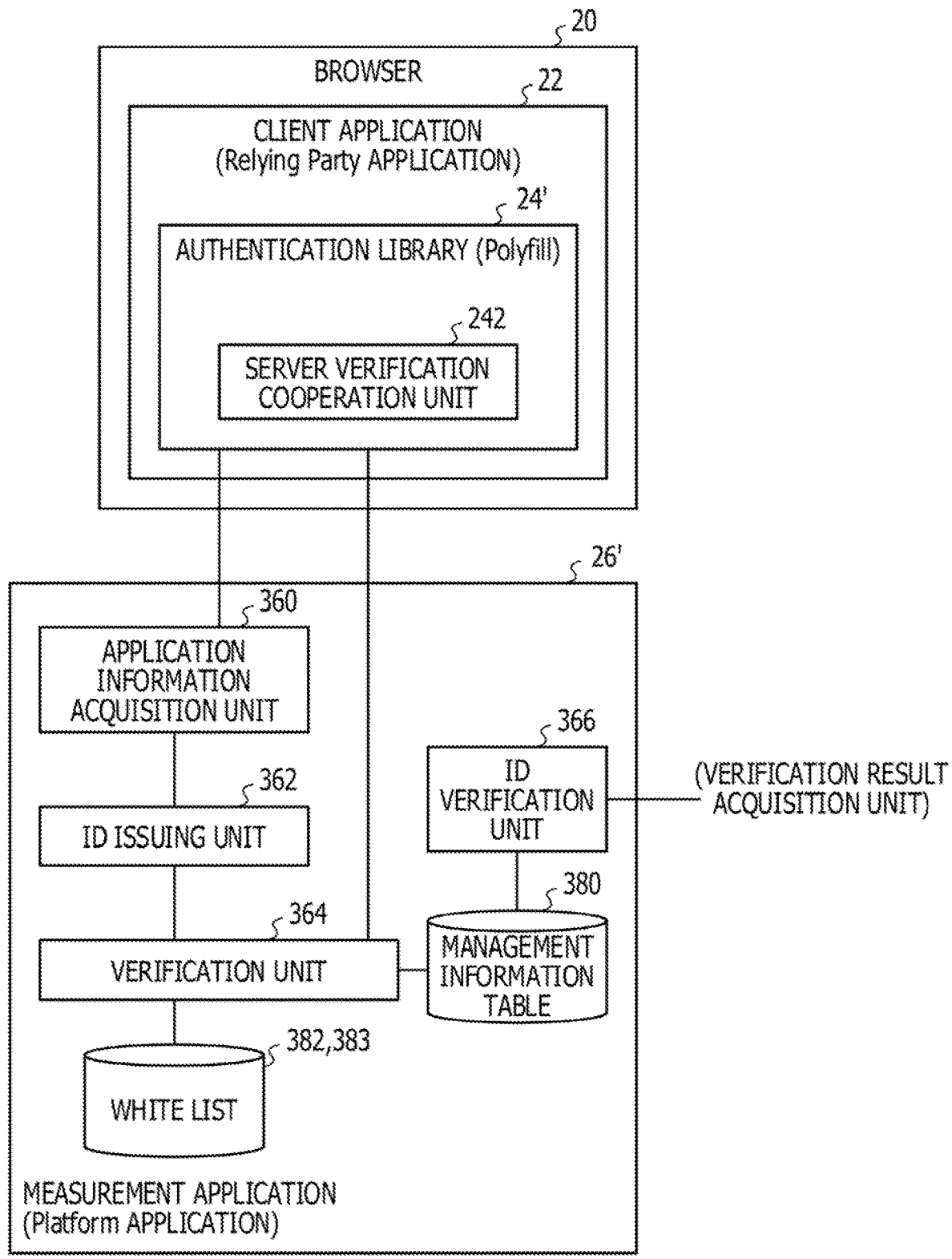
FIG. 15 is a functional block diagram of a browser and a measurement application according to the second modification.

An authentication library (Polyfill) 24' of the terminal device 100' of the second modification does not include the ID acquisition unit 244 included in the authentication library 24 of the above embodiment as illustrated in FIG. 15. The measurement application (Platform application) 26' of the terminal device 100' of the second modification has a function different from that of the Platform application 26 of FIG. 3. Specifically, for example, as illustrated in FIG. 15, the Platform application 26' includes an application information acquisition unit 360, an ID issuing unit 362 as a generation unit, a verification unit 364, and an ID verification unit 366. The Platform application 26' includes a white list 382 as a first list, a white list 383 as a second list, and a management information table 380 as a storage unit.

Figure 16A:
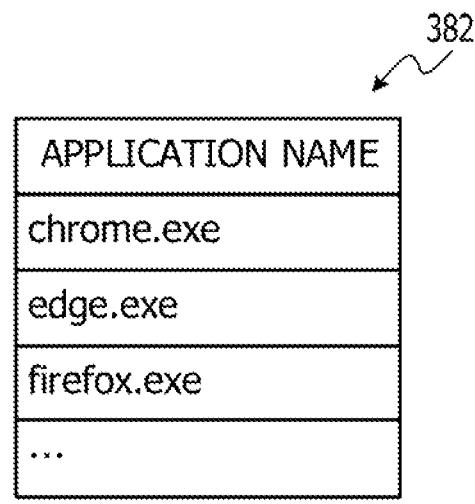
FIG. 16A and FIG. 16B are diagrams each illustrating an example of a white list according to the second modification.
Figure 16B:
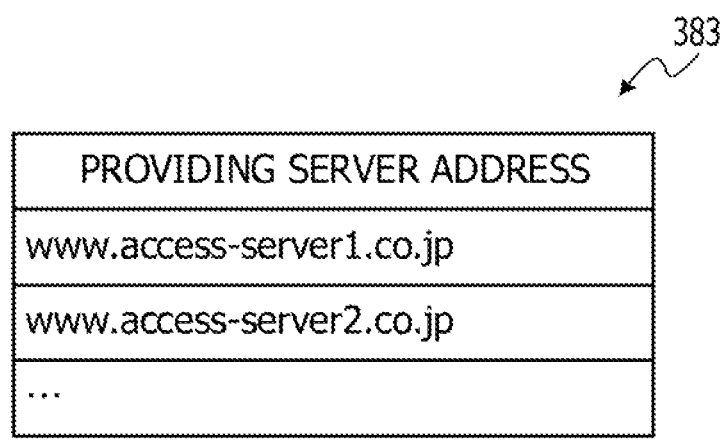

The white list 382 is a list similar to the white list 82 included in the authentication server 300 in the above embodiment. Specifically, for example, as illustrated in FIG. 16A, the white list 382 is a list in which a name (application name) of an application (browser) permitted to be coupled to the external authenticator 400' is registered in advance. As illustrated in FIG. 16B, the white list 383 is a list in which an address of a providing servers permitted to be coupled from the browser is registered in advance.

Figure 17:
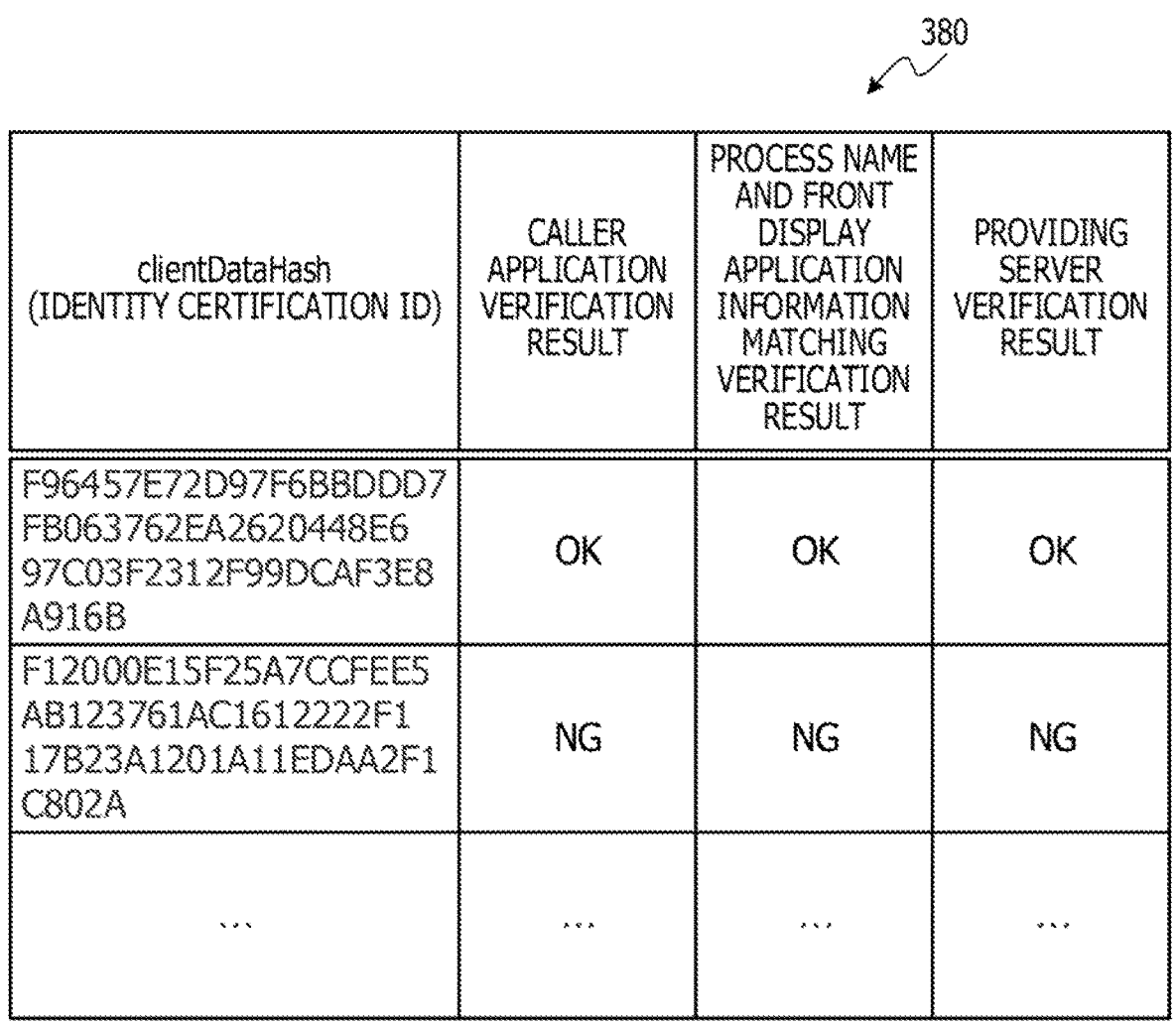
FIG. 17 is a diagram illustrating an example of a management information table according to the second modification.

The management information table 380 is a table for storing the verification result of the verification unit 364, and has a data structure as illustrated in FIG. 17. The management information table 380 will be described in detail later.

(Access Control to €External Authenticator 400' in Authentication System 10')

Next, access control to the external authenticator 400' in the authentication system 10' will be described in detail with reference to FIG. 18 to FIG. 20.

Figure 18:
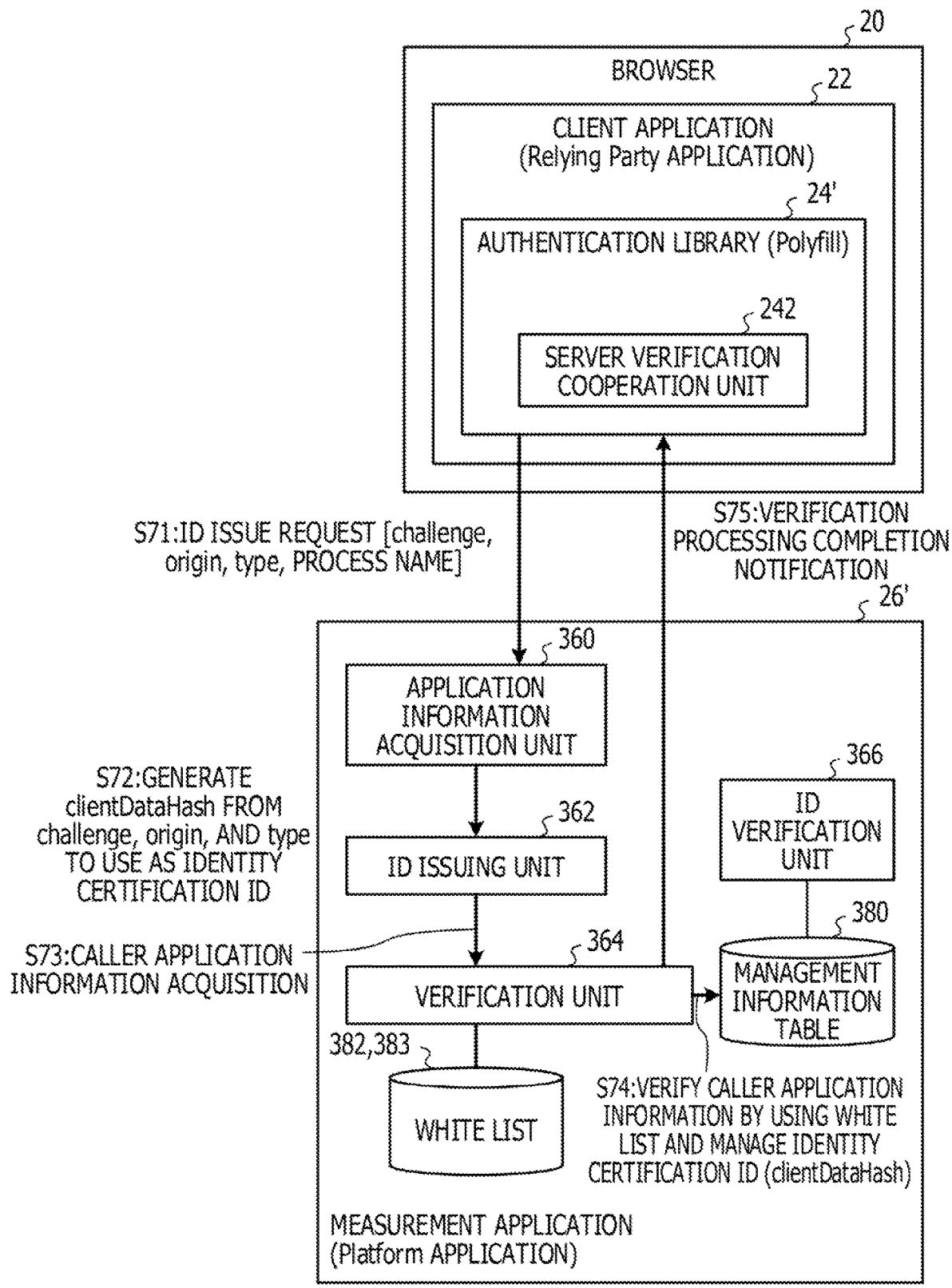
FIG. 18 is a diagram illustrating a procedure (part 1) of access control processing according to the second modification.

FIG. 18 illustrates a procedure (part 1) of the access control processing. In the processing of FIG. 18, first, when accessing the Platform application 26', the server verification cooperation unit 242 of the Polyfill 24 executes an issue request of the identity certification ID to the application information acquisition unit 360 (S71). In this case, the server verification cooperation unit 242 transmits, as the caller application information, information of challenge, origin, type, and process name to the application information acquisition unit 360. Details of challenge, origin, and type are disclosed in "FIDO Alliance", [Online], [searched on Nov. 22, 2018], Internet <https://fidoalliance.org/fido2/>, the challenge is a random value obtained from the authentication server. The origin is information represented by a scheme, a host, a port, or the like of a URL, and is, for example, "www.access-server1.co.jp:80" or the like. The type is a character string indicating registration or authentication, and is, for example, "webauthn.create" or "webauthn.get". The process name is the process name of the caller application.

Next, the ID issuing unit 362 generates clientDataHash from the challenge, origin, and type acquired from the application information acquisition unit 360, and uses the result as the identity certification ID (S72). In the second modification, instead of the identity certification ID (a unique ID generated by using the process name and the random number generation function) of the above embodiment, the clientDataHash obtainable by the API (WebAuthn API) specified in "WebAuthn spec" described in "FIDO Alliance", [Online], [searched on Nov. 22, 2018], Internet <https://fidoalliance.org/fido2/> is assumed to be used as the identity certification ID. The clientDataHash may be generated from the challenge, origin, and type.

Next, the verification unit 364 acquires the caller application information from the ID issuing unit 362 (S73). The verification unit 364 verifies the caller application information by using the white lists 382 and 383, and manages the identity certification ID (clientDataHash) in the management information table 380. Specifically, for example, the verification unit 364 refers to the white list 382 to confirm whether or not the process name transmitted from the server verification cooperation unit 242 is present in the white list 382. The verification unit 364 acquires information (front display application information) of the window (application) arranged at the forefront surface in the Windows desktop environment in the same manner as in the above embodiment, and confirms whether or not the information matches the process name transmitted from the server verification cooperation unit 242. The verification unit 364 acquires address information of the providing server 20 from the origin, and confirms whether or not the address information is present in the white list 383. The verification unit 364 stores each of the verification results (OK/NG), while linking with the identity certification ID (clientDataHash), in the management information table 380. The verification unit 364 may request the address information of the providing server 20 from the server verification cooperation unit 242 without acquiring the address information of the providing server 20 from the origin.

As illustrated in FIG. 17, the management information table 380 stores "caller application verification result", "process name and front display application information matching verification result", and "providing server verification result" in association with "clientDataHash (identity certification ID)". In the "caller application verification result", "OK" is stored in a case where the received process name is present in the white list 382, and "NG" is stored in a case of not being present. In the "process name and front display application information matching verification result", "OK" is stored in a case where the received process name and the front display application information match each other, and "NG" is stored in a case of not matching. In the "providing server verification result", "OK" is stored in a case where the address of the providing server is present in the white list 383, and "NG" is stored in a case of not being present.

As described above, when the verification result of the verification unit 364 is stored in the management information table 380, the verification unit 364 notifies the Polyfill 24' of the Relying Party application 22 of verification processing completion (S75).

Figure 19:
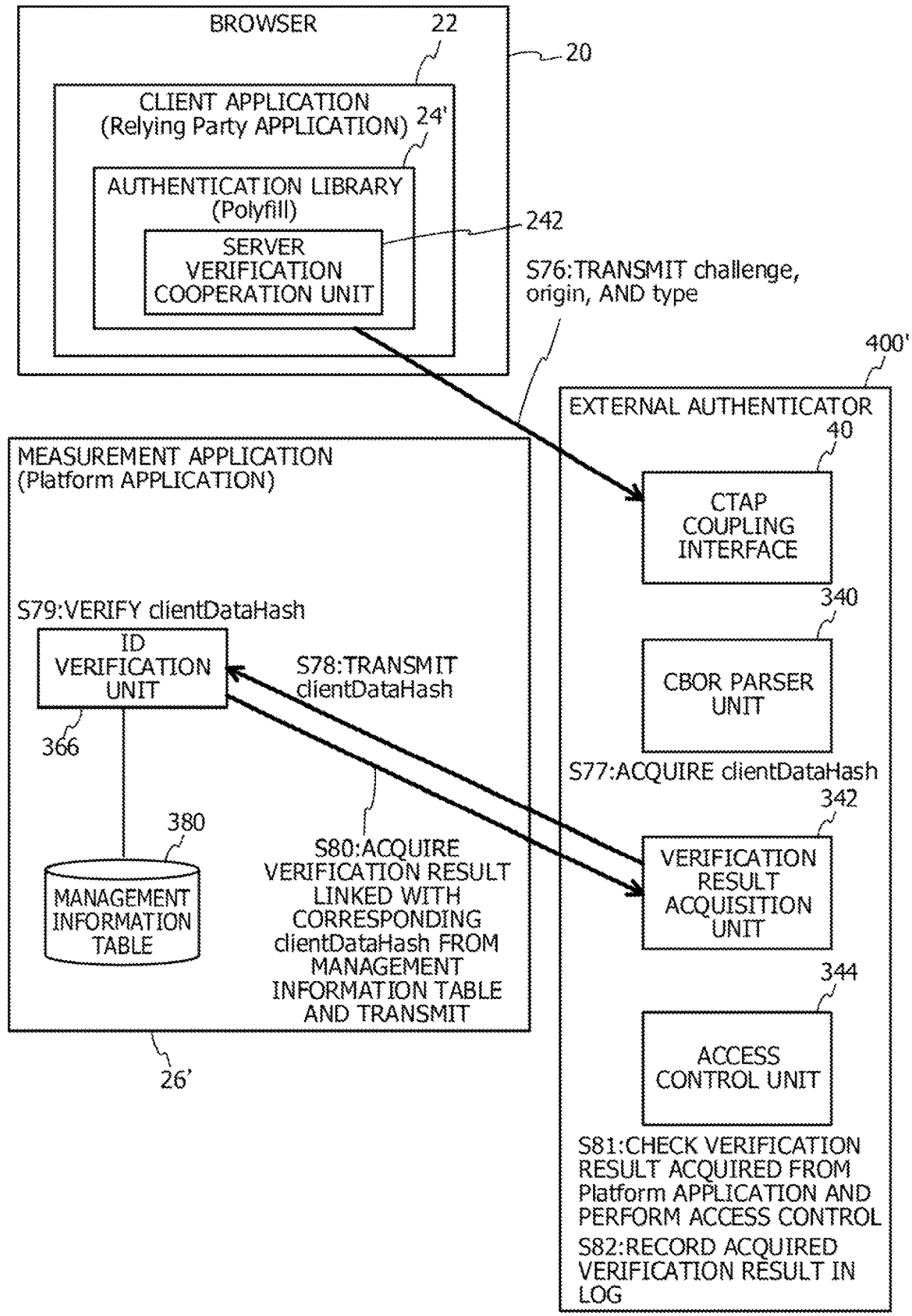
FIG. 19 is a diagram illustrating a procedure (part 2) of the access control processing according to the second modification.

FIG. 19 illustrates a procedure (part 2) of the access control processing. In the processing of FIG. 19, as described above, when the Relying Party application 22 is notified of the verification processing completion notification of step S75, the Relying Party application 22 is coupled to the CTAP coupling interface 40 of the external authenticator 400' according to a coupling method by the API (WebAuthn API) specified by "WebAuthn spec" described in "FIDO Alliance", [Online], [searched on Nov. 22, 2018], Internet <https://fidoalliance.org/fido2/>. At this time, the Relying Party application 22 transmits the challenge, origin, and type information to the external authenticator (S76).

The CBOR parser unit 340 of the external authenticator 400' parses and acquires the clientDataHash information from CBOR format data received by the CTAP coupling interface 40 (S77). The CBOR parser unit 340 transmits the clientDataHash to the ID verification unit 366 of the Platform application 26' via the verification result acquisition unit 342 (S78).

Next, the ID verification unit 366 of the Platform application 26' refers to the management information table 380, and verifies whether or not there are data matching the clientDataHash received from the verification result acquisition unit 342 of the external authenticator 400' (S79). As a result of this verification, in a case where the matching clientDataHash is present in the management information table 380, the verification result linked with the clientDataHash is acquired from the management information table 380 and returned to the verification result acquisition unit 342 of the external authenticator 400' (S80).

Next, when the verification result linked with the clientDataHash is acquired via the verification result acquisition unit 342, the access control unit 344 of the external authenticator 400' performs the access control so as to permit the signature processing of the FIDO by the external authenticator 400' when all the acquired verification results are "OK", and so as not to permit the signature processing when at least one is "NG" (S81). The access control unit 344 records the result of the access control in a log (FIG. 20) (S82). In the log in FIG. 20, three acquired verification results and permission/non-permission of the signature processing are recorded while being linked with a time stamp. The log may be referred to by an operator who maintains the external authenticator 400', for example.

As is apparent from the above description, in the second modification, the ID verification unit 366 has the functions as the acquisition unit that receives the clientDataHash generated by the external authenticator 400' and acquires the verification result linked with the clientDataHash from the management information table 380, and as a transmission unit that transmits the acquisition result to the external authenticator 400'.

As described above, according to the second modification, when the browser 20 is coupled to the external authenticator 400', the ID issuing unit 362 generates unique identification information (clientDataHash) by using the information (challenge, origin, type) acquired from the browser 20 by the application information acquisition unit 360 (S72). The verification unit 364 refers to the white list 382 to verify whether or not the clientDataHash is stored in the white list 382, and stores the verification result in the management information table 380 while linking with the clientDataHash (S74). The verification unit 364 transmits the verification completion notification to the browser 20 (S75). The ID verification unit 366 receives the clientDataHash generated by the external authenticator 400' using the information (challenge, origin, type) acquired from the browser 20 (S78), acquires the verification result linked with the received clientDataHash from the management information table 380, and transmits the verification result linked with the clientDataHash to the external authenticator 400' (S80). In this case, the access control unit 344 of the external authenticator 400' controls coupling propriety with the browser 20 based on the received verification result. In the second modification, this makes it possible to suppress the access to the external authenticator 400' from the unauthorized application within the terminal device 100'. In the second modification, since the clientDataHash used in the FIDO authentication is used as the identity certification ID, difficulty in system development may be reduced as compared to a case where the identity certification ID that is not used in the FIDO authentication is used.

In the second modification, the verification unit 364 acquires information (front display application information) of the window (application) which is disposed at the forefront surface in the Windows desktop environment. The verification unit 364 confirms whether or not the acquired front display application information and the process name of the browser 20 match each other, and stores the confirmation result in the management information table 380. In this case, in the external authenticator 400', in a case where the front display application information and the process name of the browser 20 do not match each other, by not permitting the coupling of the browser 20, it is possible to suppress an unauthorized application (an application such as a malware that operates in the background) installed in the terminal device 100' from accessing the external authenticator 400'.

In the second modification, the verification unit 364 refers to the white list 383 to verify whether or not the information of the providing server 200 coupled by the browser 20 is stored in the white list 383, and stores the verification result in the management information table 380. In this case, in the external authenticator 400', in a case where the information of the providing server 200 coupled by the browser 20 is not present in the white list 383, by not permitting the coupling of the browser 20, it is possible to suppress the access to the external authenticator 400' from an unauthorized providing server.

In the above embodiment, although the FIDO is cited as a technique in which the biometric information is collated on the side of the terminal device 100 to perform the user authentication processing, and the authentication result is transmitted to the authentication server 300 side, the technique is not limited thereto. For example, various techniques may be used as long as biometric authentication (local authentication) is performed in the external authenticator 400 coupled to the terminal device 100. The local authentication means that the biometric data are held (registered) in the external authenticator used by the user, and authentication is performed in the external authenticator by using the held biometric data.

The above-described embodiment is a preferred embodiment. However, the embodiment is not limited to this embodiment, and may be variously modified within the subject matter of the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
generate, when a browser program is coupled to an authenticator, identification information, which is unique and is to be used for an identity certification identification of the information processing apparatus, by using information which is acquired from the browser program and includes a random value, information which represented by a scheme, a host or a port of a URL and a character string indicating registration or authentication;
verify, by referring to a first list which stores permitted identification information of a browser program permitted to be coupled, whether or not the identification information is stored in the first list;
store a verification result in the memory while linking with the identification information;

transmit a verification completion notification to the browser program;

acquire, by receiving the identification information, the verification result linked with the identification information from the memory; and transmit the verification result linked with the identification to the authenticator that controls coupling propriety with the browser program.

2. The information processing apparatus according to claim 1, wherein the processor is configured to:

acquire information of an application which is displayed at a forefront surface of a display of the information processing apparatus;

perform matching verification between the information of the application that is acquired and the information acquired from the browser program; and store a result of the matching verification in the memory while linking with the identification information.

3. The information processing apparatus according to claim 1, wherein the processor is configured to:

acquire information of an information providing apparatus to which the browser program is coupled;

refer to a second list which stores information of an information providing apparatus to which the browser program is capable of being coupled;

perform verification of whether or not the information of the information providing apparatus that is acquired is stored in the second list; and store also a result of the verification in the memory while linking with the identification information.

4. The information processing apparatus according to claim 1, wherein the identification information is clientDataHash used in Fast Identity Online (FIDO) authentication.

5. An information processing method, comprising:

generating, by a computer, when a browser program is coupled to an authenticator, unique identification information, which is unique and is to be used for an identity certification identification of the information processing apparatus, by using information which is acquired from the browser program and includes a random value, information which represented by a scheme, a host or a port of a URL and a character string indicating registration or authentication;

verifying, by referring to a first list which stores permitted identification information of a browser program permitted to be coupled, whether or not the identification information is stored in the first list;

storing a verification result in a memory while linking with the identification information;

transmitting a verification completion notification to the browser program;

acquiring, by receiving the identification information, the verification result linked with the identification information from the memory; and transmitting the verification result linked with the identification information to the authenticator that controls coupling propriety with the browser program.

6. The information processing method according to claim 5, wherein in the verifying, information of an application which is displayed at a forefront surface of a display of the information processing apparatus is acquired, matching verification between the information of the application that is acquired and the information acquired from the browser program is performed, and a result of the matching verification is also stored in the memory while being linked with the identification information.

7. The information processing method according to claim 5, wherein in the verifying, information of an information providing apparatus to which the browser program is coupled is acquired, a second list which stores information of an information providing apparatus to which the browser program is capable of being coupled is referred to, verification of whether or not the information of the information providing apparatus that is acquired is stored in the second list is performed, and a result of the verification is also stored in the memory while being linked with the identification information.

8. The information processing method according to claim 5, wherein the identification information is clientDataHash used in Fast Identity Online (FIDO) authentication.

9. A non-transitory computer-readable recording medium having stored therein an information processing program that when executed by a computer causes the computer to execute a process, the process comprising:

generating, when a browser program is coupled to an authenticator, identification information, which is unique and is to be used for an identity certification identification of the information processing apparatus, by using information which is acquired from the browser program and includes a random value, information which represented by a scheme, a host or a port of a URL and a character string indicating registration or authentication;

verifying, by referring to a first list which stores permitted identification information of a browser program permitted to be coupled, whether or not the identification information is stored in the first list;

storing a verification result in a memory while linking with the identification information;

transmitting a verification completion notification to the browser program;

acquiring, by receiving the identification information, the verification result linked with the identification information from the memory; and transmitting the verification result linked with the identification information to the authenticator that controls coupling propriety with the browser program.

* * * * *